United States Patent
Zhu et al.

(10) Patent No.: US 11,075,687 B2
(45) Date of Patent: Jul. 27, 2021

(54) ADVANCED RADIO RESOURCE MANAGEMENT IN NEXT-GEN MULTI-HOP RELAYING CELLULAR NETWORK

(71) Applicant: APPLE INC., Cupertino, CA (US)

(72) Inventors: Jing Zhu, Portland, OR (US); Nageen Himayat, Fremont, CA (US); Clara Q. Li, Beaverton, OR (US); Sasha Sirotkin, Hod Hasharon (IL); Candy Yiu, Portland, OR (US); Ehsan Aryafar, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/487,955

(22) PCT Filed: Mar. 22, 2018

(86) PCT No.: PCT/US2018/023898
§ 371 (c)(1),
(2) Date: Aug. 22, 2019

(87) PCT Pub. No.: WO2018/175817
PCT Pub. Date: Sep. 27, 2018

(65) Prior Publication Data
US 2020/0007223 A1    Jan. 2, 2020

Related U.S. Application Data

(60) Provisional application No. 62/475,482, filed on Mar. 23, 2017, provisional application No. 62/475,362, (Continued)

(51) Int. Cl.
*H04B 7/155* (2006.01)
*H04W 16/26* (2009.01)
*H04W 84/04* (2009.01)

(52) U.S. Cl.
CPC ........ *H04B 7/15542* (2013.01); *H04W 16/26* (2013.01); *H04W 84/047* (2013.01)

(58) Field of Classification Search
CPC .......................... H04B 7/15542; H04W 16/26
(Continued)

(56) References Cited

U.S. PATENT DOCUMENTS

2010/0265872 A1* 10/2010 Wu .................... H04B 7/15557
370/315
2013/0235803 A1     9/2013 Yi et al.
(Continued)

OTHER PUBLICATIONS

Partial International Search Report and Written Opinion received for International Application No. PCT/US2018/023898, dated Jun. 7, 2018, 26 pages.
(Continued)

*Primary Examiner* — Peter G Solinsky
(74) *Attorney, Agent, or Firm* — Fay Kaplun & Marcin, LLP

(57) ABSTRACT

Briefly, in accordance with one or more embodiments, an apparatus of a user equipment (UE) comprises one or more baseband processors to generate a first set of one or more radio resource control (RRC) messages to create a packet data convergence protocol (PDCP) and RRC entity at a donor Fifth Generation evolved NodeB (DgNB), and to generate a second set of one or more RRC messages to create a radio link control (RLC) entity at a serving relay node (RN) to couple with the DgNB in a multi-hop relay network, and a memory to store the first set of one or more RRC messages or the second set of one or more RRC messages.

9 Claims, 23 Drawing Sheets

Related U.S. Application Data filed on Mar. 23, 2017, provisional application No. 62/506,317, filed on May 15, 2017.

(58) Field of Classification Search
USPC .......................................................... 370/315
See application file for complete search history.

(56) References Cited

U.S. PATENT DOCUMENTS

| | | | |
|---|---|---|---|
| 2013/0301611 A1* | 11/2013 | Baghel | .................... H04L 67/18 370/331 |
| 2014/0301288 A1 | 10/2014 | Koc et al. | |
| 2016/0050649 A1* | 2/2016 | Park | ...................... H04W 76/22 370/329 |
| 2019/0349871 A1* | 11/2019 | Ghosh | ................. H04W 56/001 |

OTHER PUBLICATIONS

At&T "Additional Benefit Considerations for Option 3-1," Discussion, Nov. 10-14, 2016, 5 pages, R3-162696, 3GPP TSG-RAN WG3 Meeting #94, Reno, NV.

Qualcomm Incorporated, "End-to-End Communication Reliability Aspects of Relay Architecture B," Discussion, Jan. 18-20, 2010, 2 pages, R3-100339, 3GPP TSG-RAN WG3 Meeting #66bis, Valencia, Spain.

Intel Corporation, "Scenario and Architecture for IAB," Discussion, Jan. 22-26, 2018, 5 pages, R2-1800953, 3GPP TSG RAN WG2 Meeting #AH 1801, Vancouver, Canada.

Catt, "IAB Network Architecture and Protocol Stack," Discussion, Feb. 26-Mar. 2, 2018, 5 pages, R3-180831, 3GPP TSG-RAN WG3-AH 1801, Athens, Greece.

* cited by examiner

ADVANCED RADIO RESOURCE MANAGEMENT IN NEXT-GEN MULTI-HOP RELAYING CELLULAR NETWORK

CROSS-REFERENCE TO RELATED APPLICATIONS

The present application is the National Stage application of International Application No. PCT/US2018/023898 filed Mar. 22, 2018, entitled ADVANCED RADIO RESOURCE MANAGEMENT IN NEXT-GEN MULTI-HOP RELAYING CELLULAR NETWORK, which in turn claims the benefit of U.S. Provisional Application No. 62/475,482 (P116792Z) filed Mar. 23, 2017, the benefit of U.S. Provisional Application No. 62/475,362 (P116821Z) filed Mar. 23, 2017, and the benefit of U.S. Provisional Application No. 62/506,317 (P118941Z) filed May 15, 2017. Said Application No. PCT/US2018/023898, said Application No. 62/475,482, said Application No. 62/475,362, and said Application No. 62/506,317 are hereby incorporated herein by reference in their entireties.

BACKGROUND

The Next Generation Cellular Radio Access Network (RAN), also known as the Fifth Generation (5G) network utilizing New Radio (NR) technology, will operate in millimeter wave 9 mmWave) frequency band for achieving super-high peak data rates, for example greater than 10 gigabits per second (Gbps). Due to higher path loss, however, a 5G mmWave cell covers a much smaller area than today's Long-Term Evolution (LTE) cell. Moreover, a mmWave link is highly directional, sensitive to environment, and may be easily blocked. It is therefore preferable to provide an even smaller inter-cell-distance (ISD) such that any location may be covered by multiple cells simultaneously so that reliability may be further enhanced through macro-diversity and multi-connectivity. It may be very costly to deploy such an ultra-dense network (UDN) with a wired backhaul. In view of this, the concept of "self-backhauling" in which the same wireless channel is used for both backhaul and access is becoming attractive. In some example, mmWave small-cell base stations (BS) may be mounted on street light poles and use the mmWave channel for both access and backhaul. In such an arrangement, it may take multiple hops for a small-cell BS to reach a macro-cell BS with a wired backhaul.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
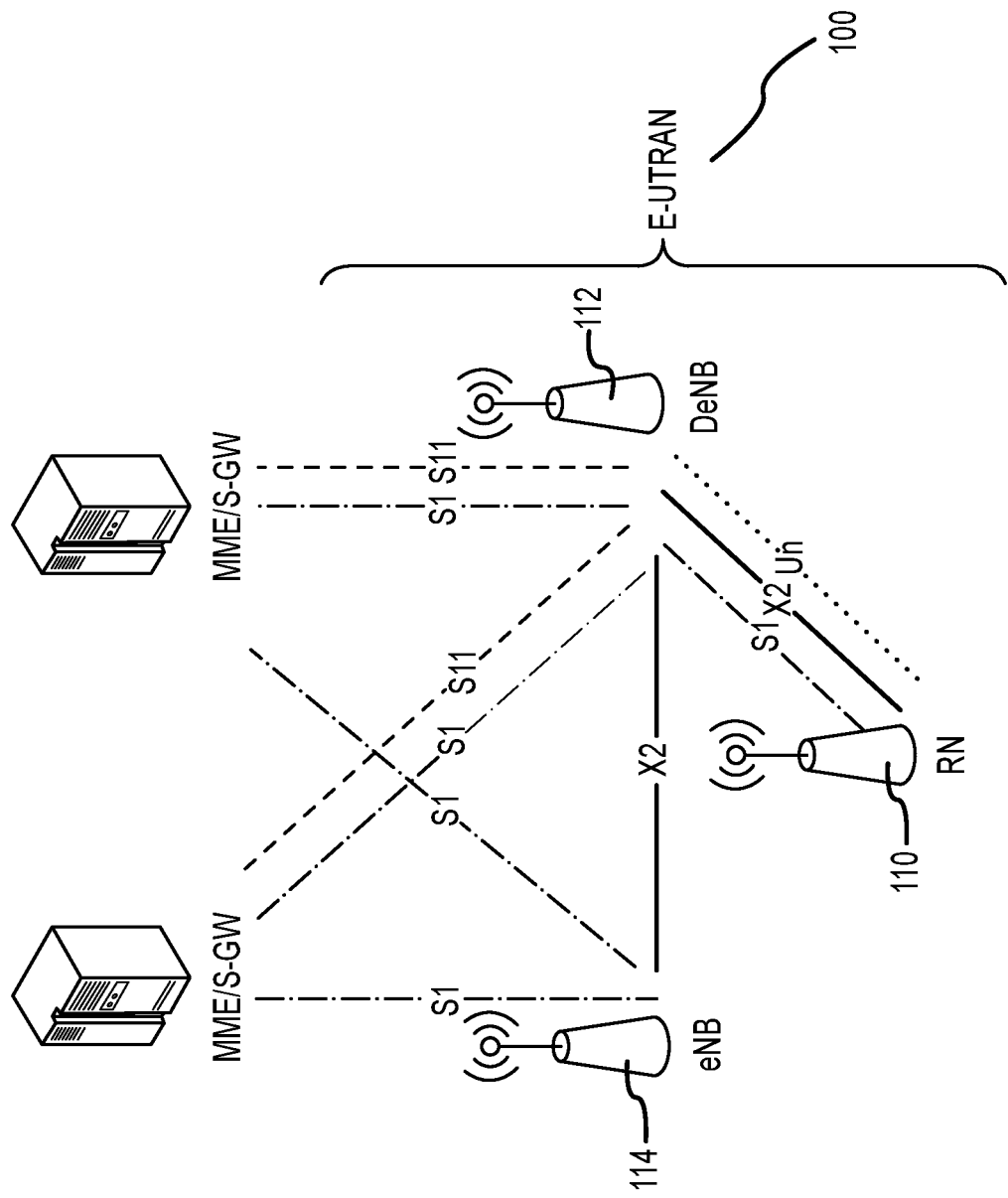
FIG. 1 is a diagram of an E-EUTRAN relay architecture in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. However, coupled may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the following description and/or claims, the terms "comprise" and "include," along with their derivatives, may be used and are intended as synonyms for each other.

Referring now to FIG. 1, a diagram of an E-EUTRAN relay architecture in accordance with one or more embodiments will be discussed. FIG. 1 shows a relay architecture of a Long-Term Evolution (LTE) Evolved Universal Terrestrial Radio Access Network (E-UTRAN) 100 specified in Release 10 of the Third Generation Partnership Project (3GPP) in which relaying is supported by having a Relay Node (RN) 110 wirelessly connect to an evolved NodeB (eNB) serving the RN 110 and called Donor eNB (DeNB) 112, via a modified version of the E-UTRA radio interface, the modified version being called the Un interface. The RN 110 supports the eNB functionality meaning it terminates the radio protocols of the E-UTRA radio interface, and the S1 and X2 interfaces. From a specification point of view, functionality defined for eNBs such as eNB 114 also applies to RNs 110 unless explicitly specified. In addition to the eNB functionality, the RN 110 also supports a subset of the user equipment (UE) functionality, for example the physical layer, layer-2, radio resource control (RRC), and non-access stratum (NAS) functionality, in order to wirelessly connect to the DeNB 112.

Today's LTE relay architecture is fully distributed and therefore not efficient when a large number of RNs 110 are connected to an RN, for example in an ultra-dense network (UDN), and every RN 110 should support the full Base Station functionalities. A new architecture to support multi-hop relaying efficiently by centralizing or offloading high-layer RN 110 functionalities, for example packet data convergence protocol (PDCP) or radio resource control (RRC), into DeNB 112 is disclosed herein.

If RN 110 can only communicate with either its parent for backhaul or its child for access, but not both in the same time, in LTE special subframes such as Multicast Broadcast Single Frequency Network (MBSFN) are reserved via RRC signaling for the backhaul communication between a RN and its parent. Since a LTE based relay must always transmit physical downlink control channel (PDCCH) in the first few symbols of the MBSFN subframe to support legacy UEs, the relay can't listen the control part of the subframe from its parent node on the backhaul link. As a result, a new control channel called Relay PDCCH (R-PDCCH) may be introduced. R-PDCCH should start late enough so that the relay could finish transmitting its own control region and switch from transmit mode to receive mode. R-PDCCH is therefore used to dynamically assign resources on the backhaul link.

In the Next Generation (Next-Gen) cellular system, also known as 5G or New Radio (NR), the downlink control channel such as PDCCH in the next-gen cellular system is expected to be UE specific, and not "always on". Thus, RN 110 no longer needs to transmit PDCCH in the first few symbols of a backhaul subframe. Therefore, a parent node can transmit PDCCH to schedule transmissions for the backhaul link using the normal PDCCH, and R-PDCCH may not be necessary. The RN 110 will be in the receive mode from the beginning of a backhaul subframe. If the parent does not schedule any resource for the RN 110, however, the subframe will be wasted.

A new centralized multi-hop relay architecture may be proposed to efficiently support integrated access and backhauling (IAB) by centralizing high layer protocol processing, for example RRC or PDCP, at the macro-cell BS. As discussed herein, neighbor discovery and synchronization in multi-hop relaying may be addressed. A Relay Node (RN) 110 may operate as a normal base station from the UE perspective and therefore should periodically send out a synchronization signal and broadcast signal, namely Primary Synchronization Signal (PSS), Secondary Synchronization Signal, or Physical Broadcast Channel (PBCH). On the other hand, RN 110 operates as a UE from the perspective of a parent RN 110 or a DeNB (or DgNB) 112 and should continue monitoring PSS/SSS/PBCH to discovery neighboring RNs. It may be especially beneficial for enhancing reliability of a relaying link, for example a Relay Node may be moving around, as mobile RN 110, or the relaying link may operate in high frequency band such as mmWave and suffer from temporary outage due to blockage.

Figure 2:
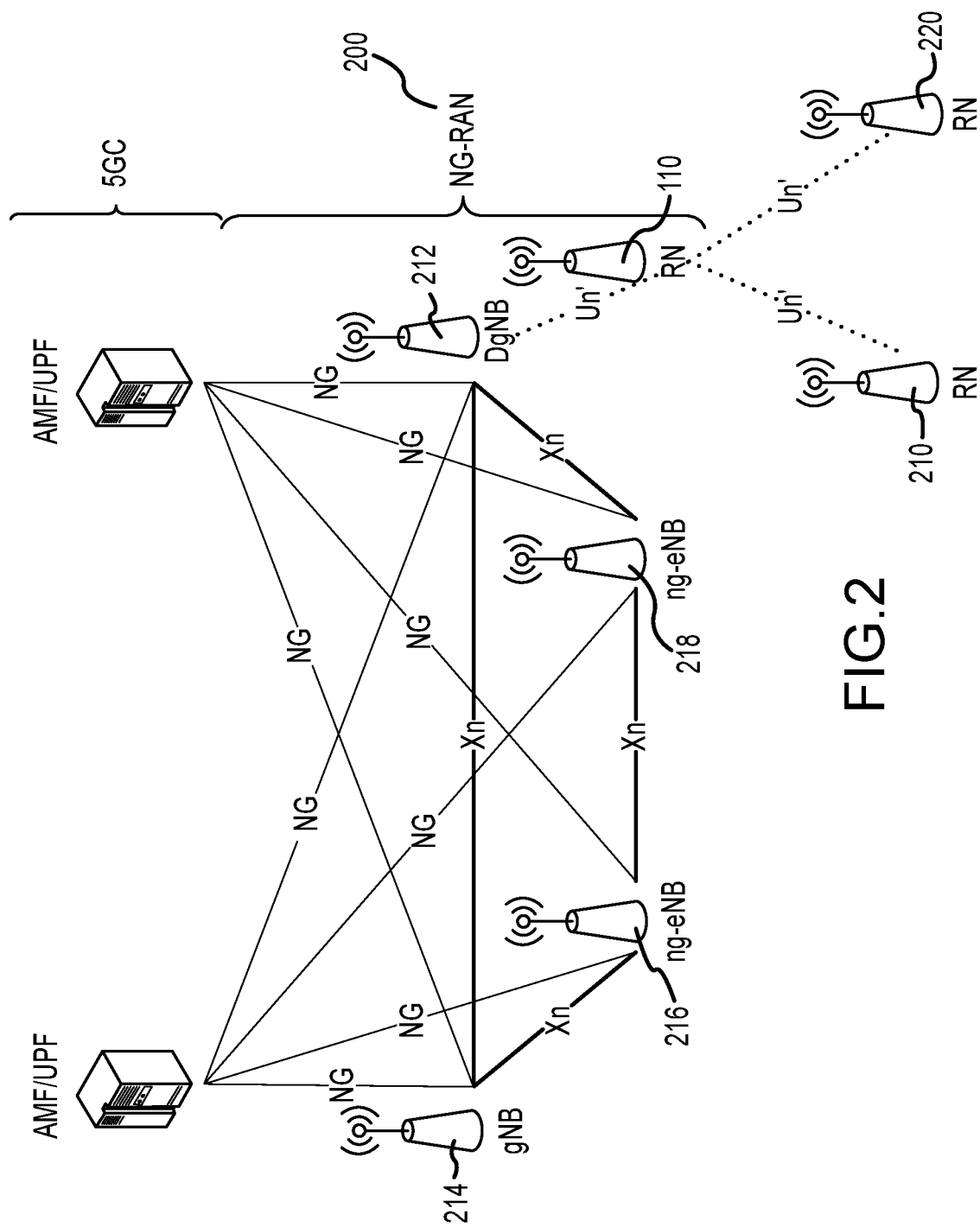
FIG. 2 is a diagram of a centralized multi-hop relay architecture in accordance with one or more embodiments.

Referring now to FIG. 2, a diagram of a centralized multi-hop relay architecture in accordance with one or more embodiments will be discussed. FIG. 2 shows a proposed centralized multi-hop relay architecture for a Next Generation (NG) Radio Access Network (RAN), or NG-RAN 200 comprising a 5G NR Donor evolved NodeB (DgNB) such as DgNB 212, a 5G eNB such as gNB 214, and a next-gen eNB such as ng-eNB 216, and/or ng-eNB 218. As shown in FIG. 2, RN 110 no longer needs to support any core network (CN) interfaces such as NG/S2 or Xn/X2. Instead, DgNB 212 will terminate the CN interfaces for a UE even if the UE is attached to a RN 110. Moreover, the interface between RN 110 and DgNB 212 is the same interface as between two RNs such as RN 110 and RN 210 or RN 110 and RN 220 and which may be referred to herein as an "Un'" interface.

Figure 3:
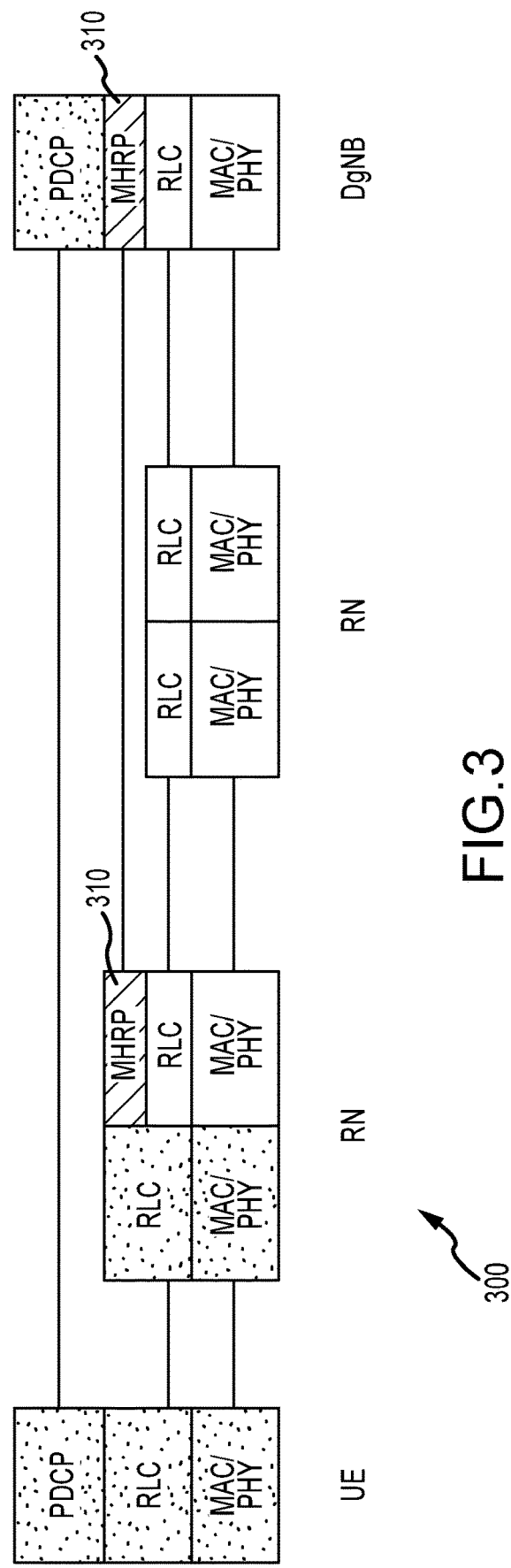
FIG. 3 is a diagram of a centralized multi-hop relay U-plane stack in accordance with one or more embodiments.
Figure 4:
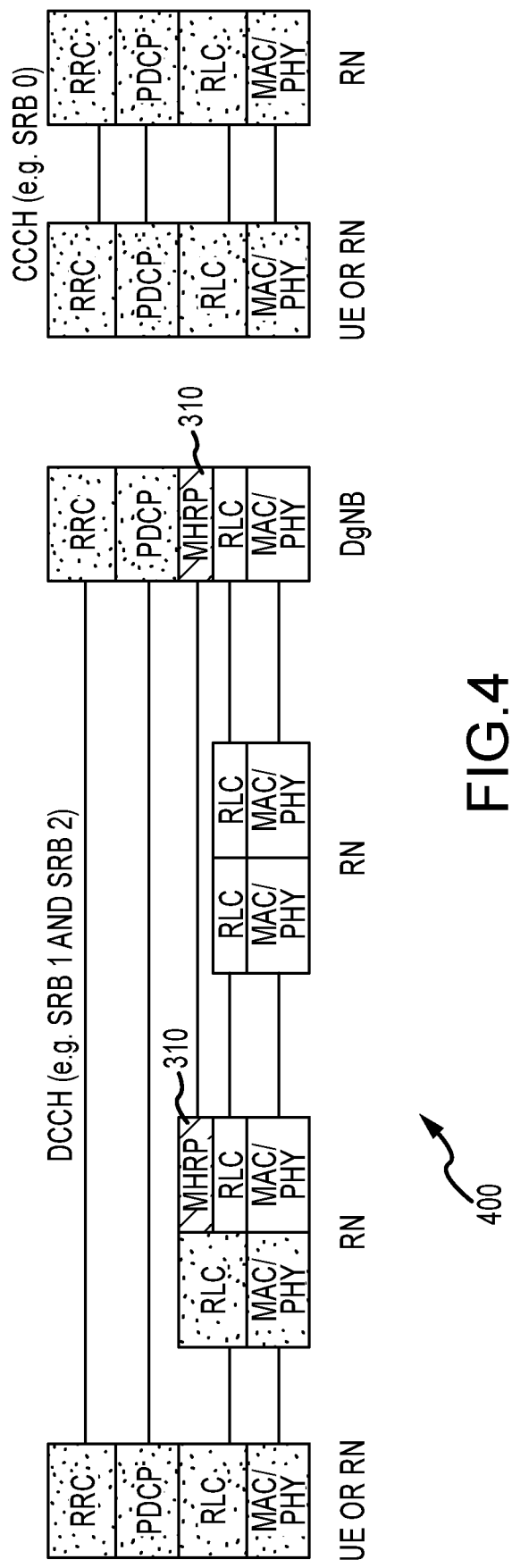
FIG. 4 is a diagram of a centralized multi-hop relay C-plane stack in accordance with one or more embodiments.

Referring now to FIG. 3 and FIG. 4, diagrams of a centralized multi-hop relay U-plane stack 300 and C-plane stack 400 in accordance with one or more embodiments will be discussed. FIG. 3 and FIG. 4 show the U-plane protocol and the C-plane protocol, respectively, for the proposed centralized multi-hop relay architecture discussed herein. It is proposed to split RN u-plane protocol stack between PDCP and RLC, and to move PDCP & above to DgNB 212 for centralized processing. Hence, any resource or overhead at RN 110 for processing PDCP and above may be eliminated. On the control-plane, such RAN splitting may apply to only Dedicated Control Channel (DCCH) such as SRB 1 and SRB 2. Common Control Channel (CCCH) such as SRB 0 may still be processed locally at RN 110.

RN 110 may attach to DgNB 212 the same way as a UE with the full protocol stack, and DgNB 212 may configure or manage a RN 110 through Layer 3 (L3) RRC signaling. A new layer between PDCP and RLC at RN 110 and DgNB t212 is proposed to handle the following new functionalities. Multi-hop forwarding is a new functionality to add for the uplink (UL) or remove for the downlink (DL) the Multi-Hop Relay Protocol (MHRP) header if the packet is for a UE that is attached to the RN 110, and to forward the MHRP protocol data unit (PDU) to next hop accordingly. UE radio bearer (RB) multiplexing is a new functionality to map or multiplex multiple UE RBs with the same quality of service (QoS) requirements to a RN RB. Alternatively, the above new MHRP functionalities may be supported by radio link control (RLC) or PDCP, that is the MHRP PDU defined below as a PDU of a new protocol can alternatively be define as a new type of RLC PDU or PDCP PDU.

MHRP may operate between RN 110 and gNB 214 or RN 110 and is transparent to the UE. Moreover, an intermediate RN 10 may forward a MHRP PDU to a next hop based on the MHRP header info without any additional processing. The multi-hop relay protocol (MHP) PDU format is shown below.

| MHRP Hdr | PDCP PDU or GTP-u PDU |
|---|---|

The MHRP header (MHRP Hdr) may contain the following information. The UE identifier (ID) is the identification to uniquely identify a UE in its serving RN 110. RN ID is the identification to uniquely identify a RN 110 that a UE is attached to in its serving DgNB 212. RB ID is the identification to uniquely identify a UE data RB or signal RB in the UE. Alternatively, the MHRP header fields may be added in the beginning or the end of a PDCP PDU or RLC service data unit (SDU). If the central unit (CU)/distributed unit (DU) split architecture is supported, a MHRP PDU may also carry General Packet Radio Service (GPRS) Tunneling Protocol (GTP-U) PDU as the payload.

Figure 5:
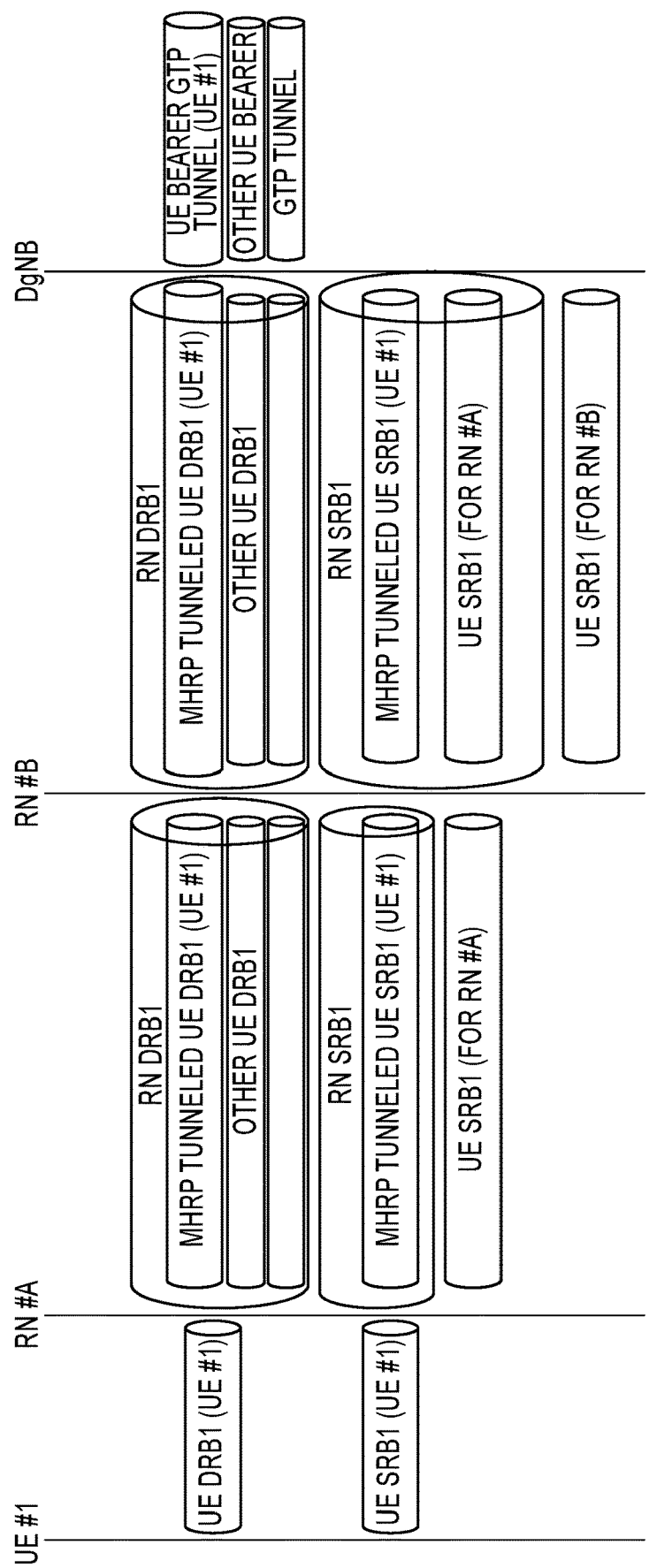
FIG. 5 is a diagram of a multi-hop relay radio bearer model in accordance with one or more embodiments.

Referring now to FIG. 5, a diagram of a multi-hop relay radio bearer model in accordance with one or more embodiments will be discussed. FIG. 5 shows an example of a new radio bearer model 500 to support the centralized multi-hop relaying proposed herein. There are two types of radio bearers, a RN Radio Bearer (RB) and UE Radio Bearer. The RN RB, also called Relay Link Radio Bearer (RLRB), is introduced for delivering an MHRP tunneled UE RB which does not have the PDCP layer. The UE RB is similar to RB in the present LTE system and does not have the new MHRP layer. Also, the PDCP layer of a UE RB is always terminated at DgNB 212, and the RLC and below is terminated locally at wherever the UE is attached. An RN 110 should have its own UE RB such as SRB 1 for communication with DgNB. 212. As shown in FIG. 5, multiple UE RBs may be multiplexed using the new MHRP layer and transported via a same RN RB. Also, a child RN RB may be one to one mapped to a parent RN RB.

Figure 6:
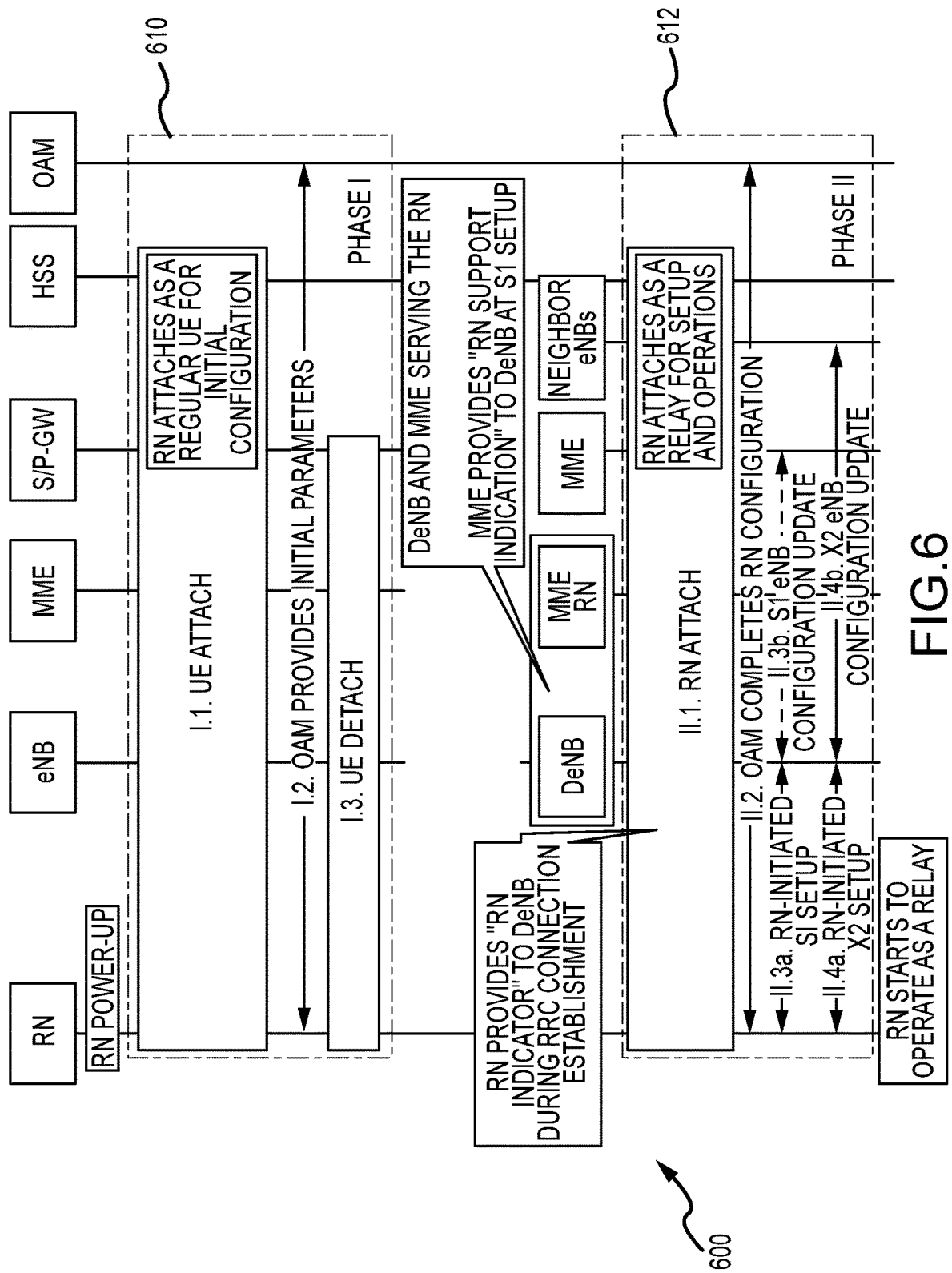
FIG. 6 is a diagram of an E-UTRAN relay node startup procedure in accordance with one or more embodiments.

Referring now to FIG. 6, a diagram of an E-UTRAN relay node startup procedure in accordance with one or more embodiments will be discussed. FIG. 6 shows the relay node (RN) startup procedure 600 as specified in Release 10 of 3GPP with changes as described herein. The RN startup procedure 600 comprises following two phases. Phase I procedure 610 comprises an attach procedure for RN reconfiguration. The RN 110 attaches to the E-UTRAN/Evolved Packet Core (EPC) as a UE at power-up and retrieves initial configuration parameters, including the list of DeNB cells, from RN Operations and Management (OAM). After this operation is complete, the RN 110 detaches from the network as a UE and triggers Phase II procedure 612. The Mobility Management Entity (MME) performs the serving gateway (S-GW) and packet gateway (P-GW) selection for the RN 110 as a normal UE.

Phase II procedure 612 comprises an attach procedure for RN operation. The RN 110 connects to a DeNB 112 (or DgNB 212) selected from the list acquired during Phase I 610 to start relay operations. For this purpose, the normal RN attach procedure may be applied. After the DeNB 112 (or DgNB 212) initiates setup of bearer for S1/X2, the RN initiates the setup of S1 and X2 associations with the DeNB 112 (or DgNB 212). In addition, the DeNB 112 may initiate an RN reconfiguration procedure via RRC signaling for RN-specific parameters.

In the proposed centralized multi-hop relay (MHR) architecture discussed herein, the Phase 1 procedure 610 may be reused without any change for RN reconfiguration, and the Phase II procedure 612 may be simplified by removing all the operations and/or signaling such as Phase II procedure 612 operations 3a, 3b, 4a, and/or 4b, used for establishing S1/X2 interfaces between RN 110 and core network elements such as the S-GW or the MME.

Figure 7:
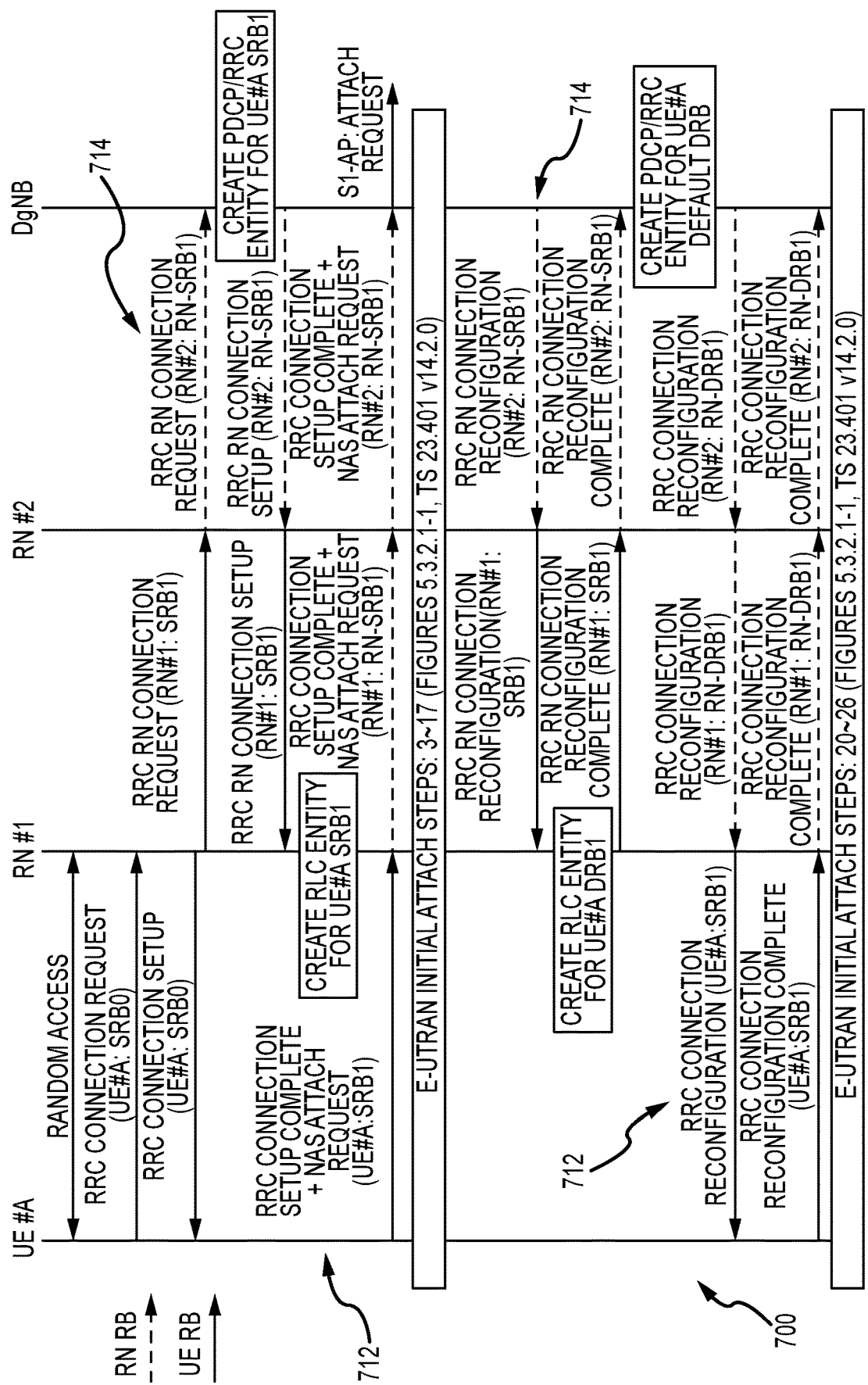
FIG. 7 is a diagram of a UE attached procedure with centralized multi-hop relaying in accordance with one or more embodiments.

Referring now to FIG. 7, a diagram of a UE attached procedure with centralized multi-hop relaying in accordance with one or more embodiments will be discussed. FIG. 7 shows a UE attach procedure 700 with centralized multi-hop relaying. UE attach procedure 700 follows the same E-UTRAN attach procedure as described in 3GPP Technical Specification (TS) 23.401 with the following differences. Legacy RRC messages 712 of SRB1 & SRB2 may be exchanged between UE and DgNB 212 for UE radio bearer setup and configuration and may be tunneled through RN radio bearer if necessary. New RRC messages 714 may be exchanged between the DgNB 212 and the serving RN such as RN #1 for setting up RLC entities for UE SRB and DRB at RN, as well as the corresponding PDCP/RRC entities at DgNB 212. These new RRC messages also may be tunneled through RN radio bearer if necessary.

It may be assumed that RN bearers such as RN-SRB1 and RN-DRB1 are already established before the UE starts the UE attach procedure 700.

Figure 8:
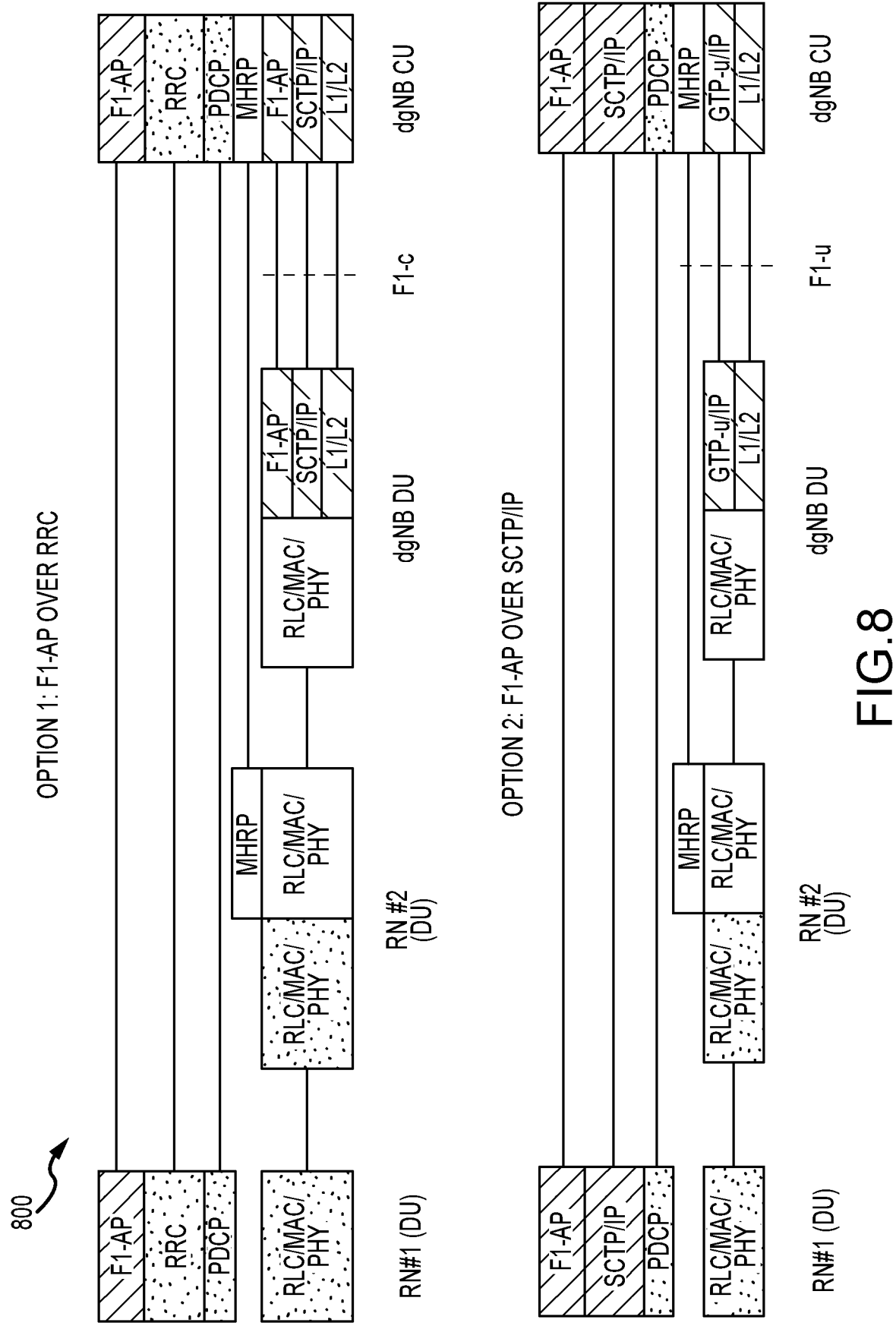
FIG. 8 is a diagram of an E2E F1-AP protocol stack in a centralized multi-hop relay with CU/DU splitting in accordance with one or more embodiments.

Referring now to FIG. 8, a diagram of an end-to-end (E2E) F1-Application Protocol (AP) protocol stack 800 in a centralized multi-hop relay with centralized unit (CU)/distributed unit (DU) splitting in accordance with one or more embodiments will be discussed. For centralized Multi-Hop Relay with CU/DU splitting, FIG. 8 shows how to support centralized multi-hop relay with CU/DU splitting such as described in 3GPP TS 38.470. In such an arrangement, RN 110 operates as a Distribute Unit (DU). The F1-AP protocol of 3GPP TS 38.470 is for the control-plane message exchange between DU and CU. It has been specified in 3GPP TS 38.470 to deliver "F1-AP" over stream control transmission protocol (SCTP)/Internet protocol (IP) as shown in Option 2 of FIG. 8, which may not be efficient for a relay node. It is proposed herein to deliver "F1-AP" over a new RRC message referred to as the "F1-AP container" as shown in Option 1 of FIG. 8.

The F1-AP protocol may be extended to support relays with the following enhancements. For F1 Setup, at least the relay node ID may be added. In addition, a new F1 Resource Coordination message may be defined, to allow efficient resource coordination between the relay and the donor nodes. Alternatively, CU/DU Configuration Update messages may be enhanced to carry this information.

Figure 9:
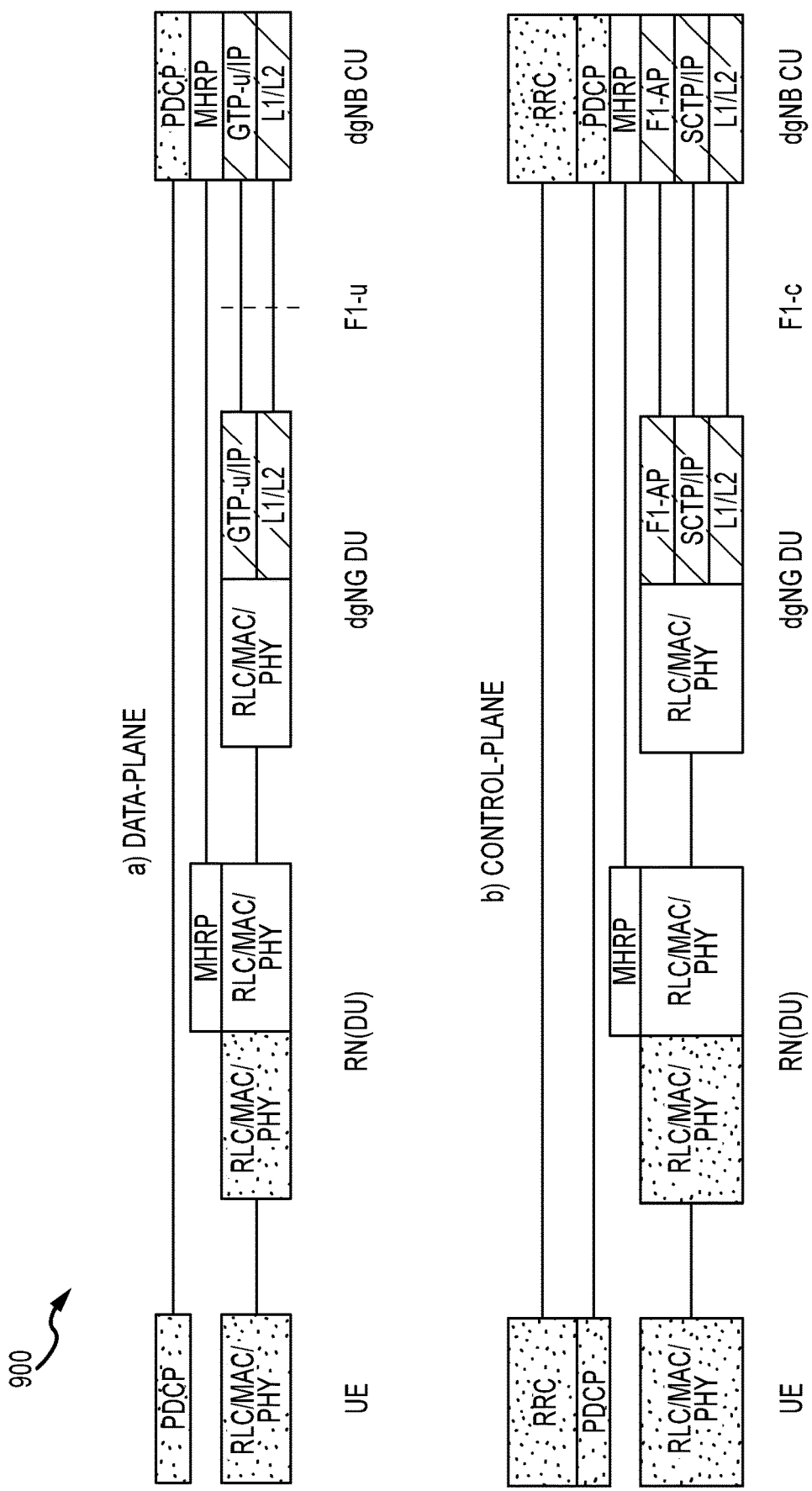
FIG. 9 is a diagram of an E2E UE protocol stack in a centralized multi-hop relay with CU/DU splitting in accordance with one or more embodiments.

Referring now to FIG. 9, a diagram of an E2E UE protocol stack 900 in a centralized multi-hop relay with CU/DU splitting in accordance with one or more embodiments will be discussed. In FIG. 9 the data-plane transport (a) between UE and DgNB CU may be supported by the F1-U interface between DgNB CU and DgNB DU, and by the layer-2 forwarding (without F1-U) between DgNB DU and RN DU. In addition, we propose to support the control-plane transport (b) between UE and DgNB CU by the F1-C interface between DgNB CU and gNB DU, and by the layer-2 forwarding without F1-C between DgNB DU and RN U.

Figure 10:
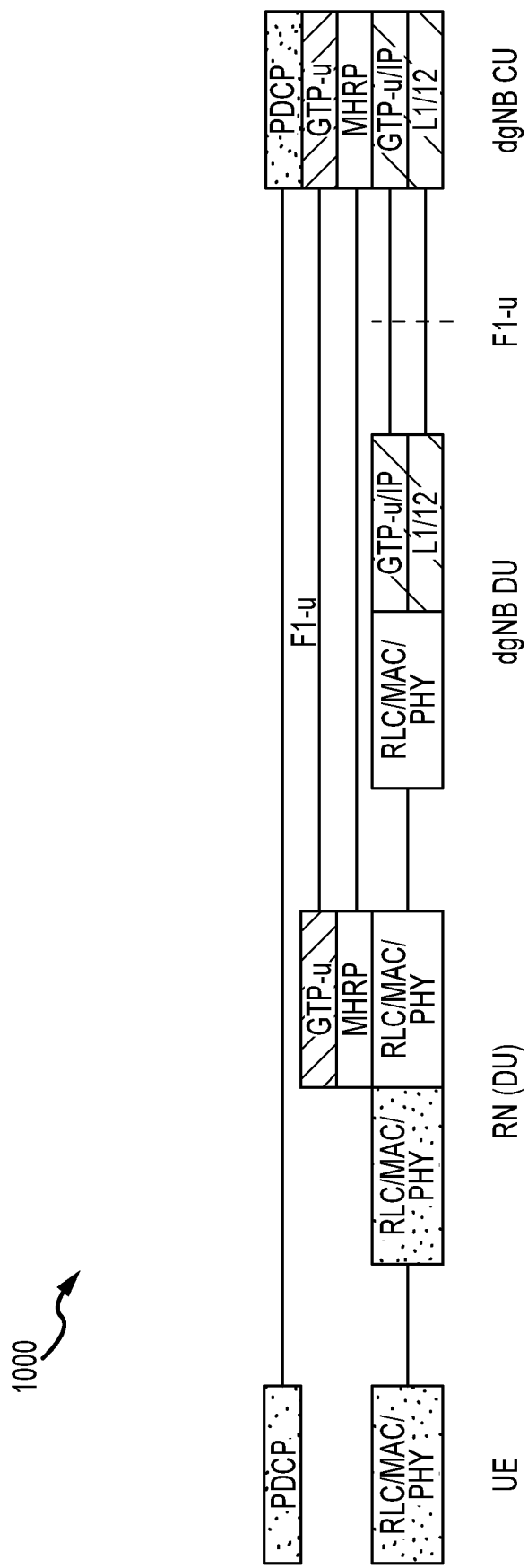
FIG. 10 is a diagram of an E2E UE U-plane protocol stack in a centralized multi-hop relay with CU/DU splitting and GTP-u (F1-u) support in accordance with one or more embodiments.

Referring now to FIG. 10, a diagram of an E2E UE U-plane protocol stack 1000 in a centralized multi-hop relay with CU/DU splitting and GTP-u (F1-u) support in accordance with one or more embodiments will be discussed. FIG. 10 shows support for the F1-U (GTP-u) interface between RN DU and DgNB CU by using the MHRP as the transport for GTP-u protocol. In this case, GTP-u may provide info such as tunnel endpoint identifier (TEID) to identify a UE radio bearer at the serving RN, and therefore it is sufficient that the MHRP header only carries the RN ID of the serving RN but not the UE ID or the RB ID.

Figure 11:
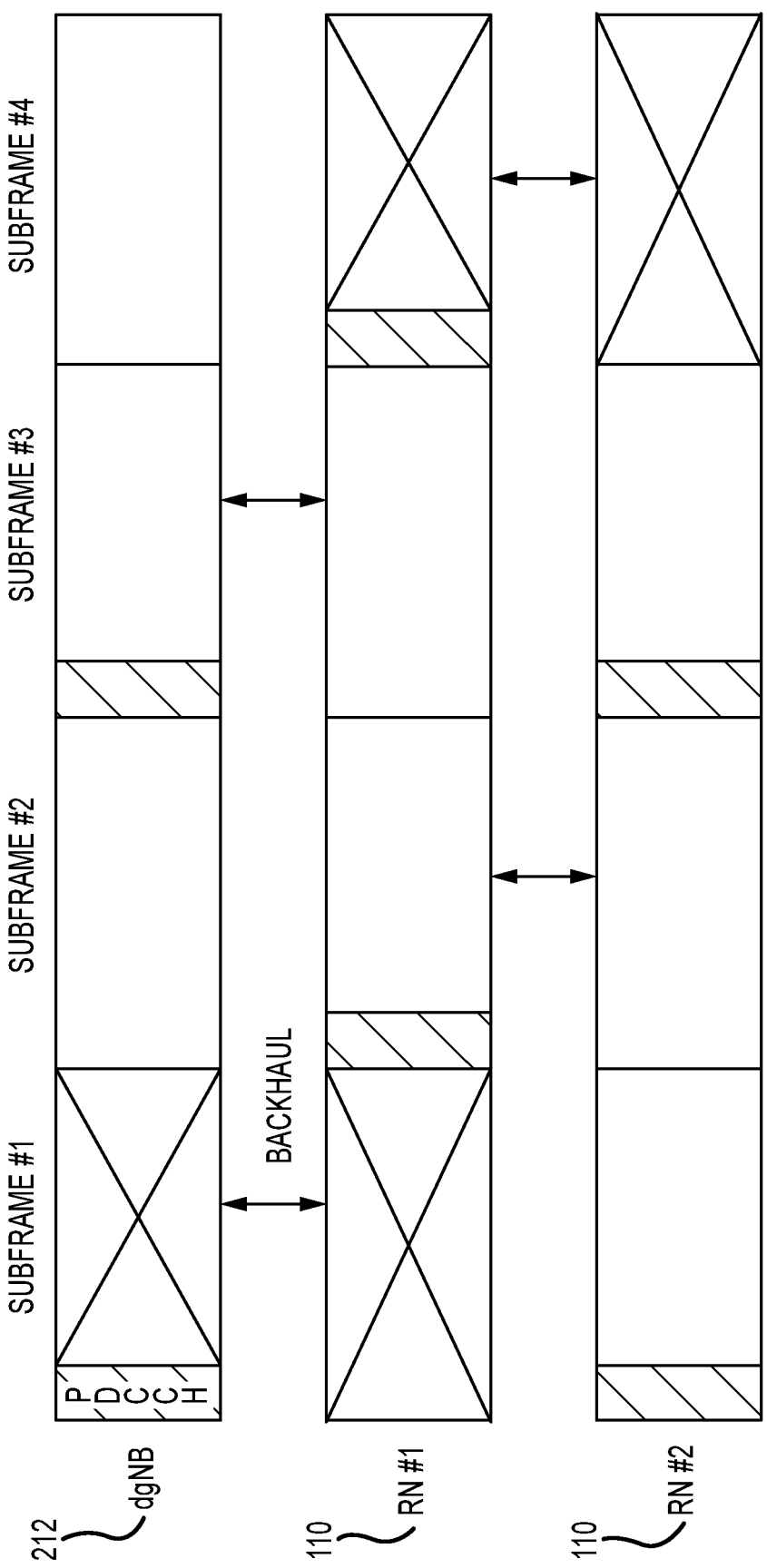
FIG. 11 is a diagram of static PDCCH allocation in a backhaul subframe accordance with one or more embodiments.

Referring now to FIG. 11, a diagram of static PDCCH allocation in a backhaul subframe accordance with one or more embodiments will be discussed. FIG. 11 shows an example of two-hop relaying, namely DgNB 212 a first RN 110 (RN #1) to a second RN 110 (RN #2) to the UE. It should be noted that the UE may also connect via RN #1 or with DgNB directly. Subframe #1 and subframe #3 may be configured for the backhaul link of RN #1, and subframe #2 and subframe #4 may be configured for the backhaul link of RN #2. As a result, RN #1 can use subframe #2 and subframe #4 to communicate with its child, and RN #2 can use subframe #1 and subframe #3 to communicate with its child. As shown in FIG. 11, subframe #1 is wasted for RN #1 because DgNB 212 has nothing to schedule. Similarly, subframe #4 is also wasted for RN #2 because RN #1 has nothing to schedule.

As discussed herein, this issue may be addressed by allowing an RN 110 to opportunistically schedule transmissions for the access link in a subframe preconfigured or reserved for the backhaul link. As used herein, the term access link may refer to the communication link between a node and its child node. The term backhaul link may refer to the communication link between a node and its parent node. The backhaul subframe may refer to a subframe reserved for the backhaul link by the parent. The term access subframe may refer to a subframe that is not reserved for the backhaul link. The term access load may refer to the traffic load over the access link of a node. The term backhaul load may refer to the traffic load over the backhaul link of a node.

Figure 12:
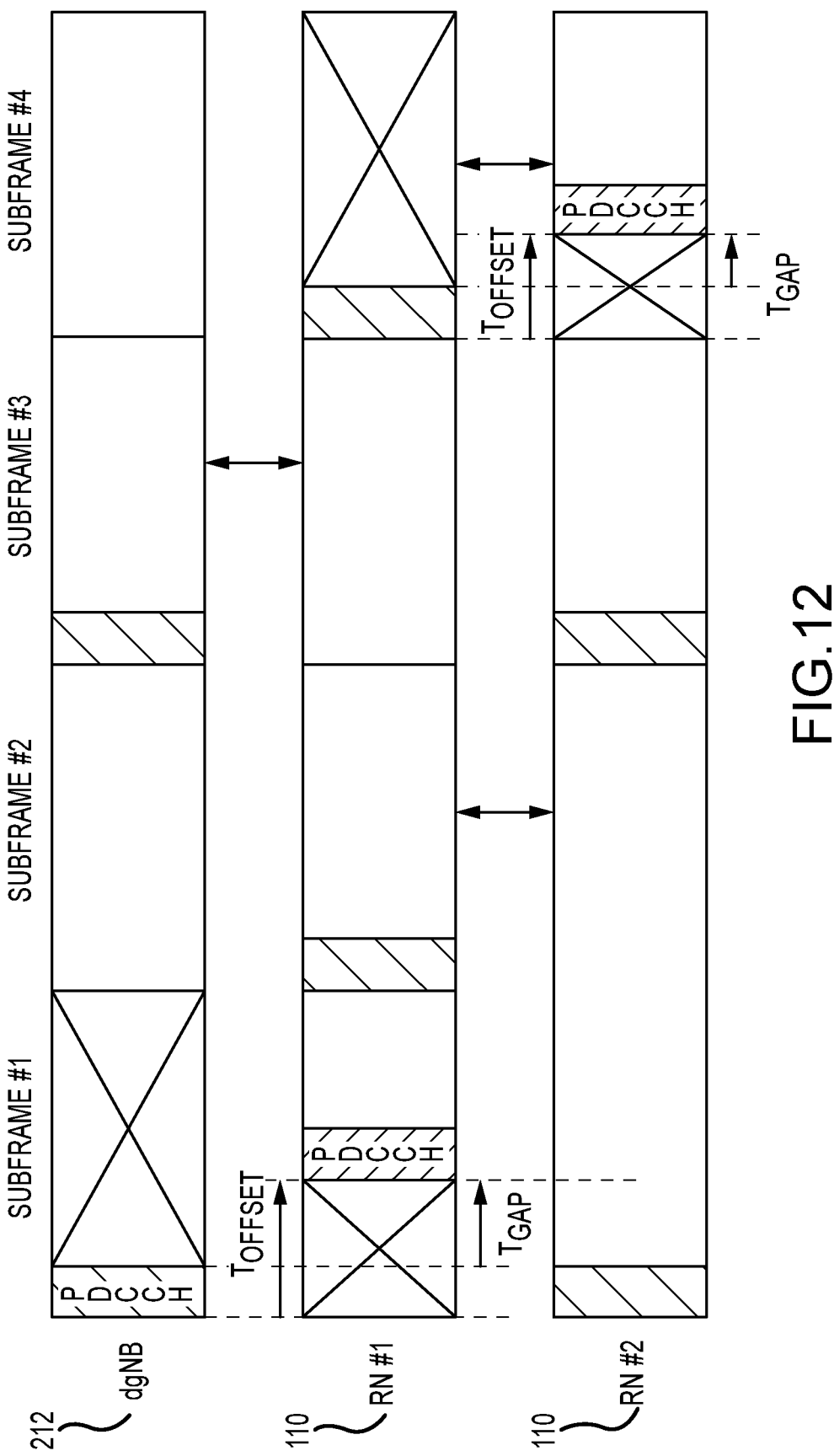
FIG. 12 is a diagram of opportunistic PDCCH allocation in a backhaul subframe in accordance with one or more embodiments.

Referring now to FIG. 12, a diagram of opportunistic PDCCH allocation in a backhaul subframe in accordance with one or more embodiments will be discussed. FIG. 12 shows opportunistic physical downlink control channel (PDCCH) allocation when an RN 110 finds out based on PDCCH from its parent node that there is no allocation for itself in the current backhaul subframe. The RN 110 can switch to the transmission mode and transmit the PDCCH to schedule allocation for its access link. The following parameters may be discussed. As shown in FIG. 12, $T_{GAP}$ is the processing delay for an RN 110 to switching from a receive mode to a transmit mode. $T_{OFFSET}$ is the symbol index of the PDCCH symbol for the access link of the RN 110. N is the number of PDCCH symbols for the backhaul or access link. $T_{START}$ is the symbol index of the first PDCCH symbol for the backhaul link of the RN 110. In one or more embodiments:

$$T_{OFFSET} \geq T_{START} + N + T_{GAP}$$

An RN 110 or DgNB 212 can configure its UE an opportunistic PDCCH in backhaul subframes via UE-specific control signaling such as RRC or broadcast messages such as. SIB with the parameter $T_{OFFSET}$. As a result, the UE will start receiving at the $T_{OFFSET}$ symbol of a subframe to detect the opportunistic PDCCH.

In addition, the RN 110 or DgNB 212 may configure a new "Opportunistic PDCCH" subframe pattern via UE-specific control signaling such as RRC or broadcast messages such as SIB to indicate in which subframe such opportunistic PDCCH may be allocated, so that the UE does not need receive in every subframe. The opportunistic PDCCH will be available only if there is no data on the backhaul link, the UE should still be configured with a normal PDCCH in the access subframe, and a normal PDCCH can be scheduled at the beginning of a subframe without the $T_{OFFSET}$ constraint of the above equation.

Figure 13:
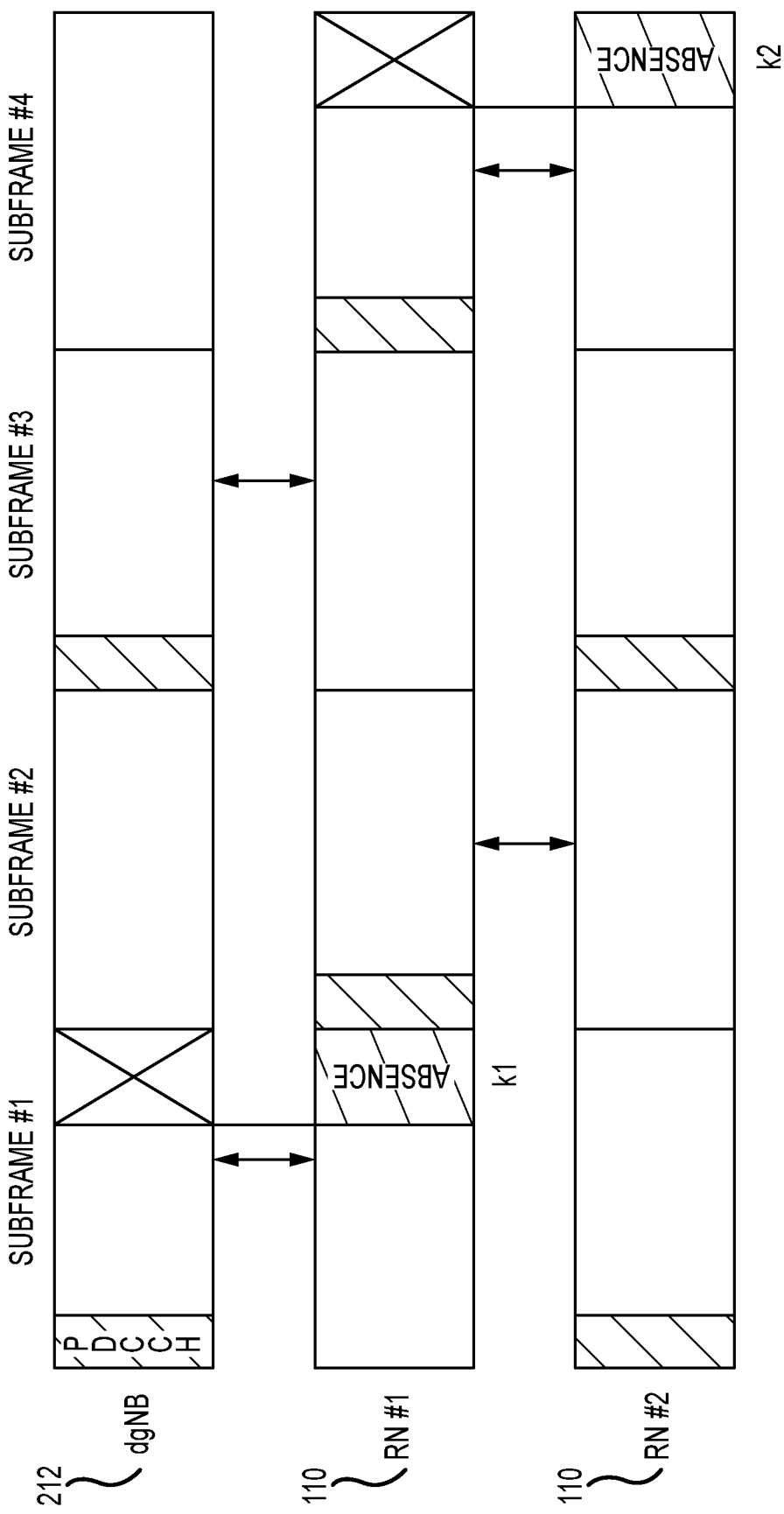
FIG. 13 is a diagram of an absence allocation in a backhaul subframe in accordance with one or more embodiments.

Referring now to FIG. 13, a diagram of an absence allocation in a backhaul subframe in accordance with one or more embodiments will be discussed. An RN 110 or DgNB 212 may provide persistent or semi persistent allocation over the access link for its child nodes such as RN 110 or the UE. One or more such persistent or semi persistent allocations may be needed for various operations, for example random access, synchronization, beam training, sector sweep, broadcast, and/or scheduling request. If such persistent allocation over the access link overlaps with a backhaul subframe, then it is proposed to have the RN 110 report its absence due to persistent or semi persistent allocations using the following parameters. Number of Absences, Index, Start Time of the first Absence (SFN, frame number, subframe index, symbol index), Absence Interval in the unit of symbols, Absence Cycle in the unit of frame or subframes, alternatively, Absence Subframe Pattern in bitmap, and Absence Duration in the unit of cycles.

The parent node should not schedule anything during the absence interval in a backhaul subframe. FIG. 13 shows such an example in which RN #1 notifies its parent DgNB 212 that it will be absent in the last k1 symbols of subframe #1, and RN #2 notifies its parent RN #1 that it will be absent in the last k2 symbols of subframe #4. In response, The DgNB 212 or RN #1 won't schedule anything for RN #1 or RN #2) in the absence interval. As a result, a backhaul subframe is shortened by the inserted absence interval. An absence interval may occupy the whole subframe so that the parent node won't allocate anything for the RN 110 in the subframe. The RN 110 may configure or reconfigure one or multiple absences to its parent via media access control (MAC) control or RRC signaling.

If the central unit (CU)/distributed unit (DU) splitting architecture as specified 3GPP TS 38.401 is supported, the Relay Node is operated as DU and DgNB 212 is operated as CU. The absence report may be delivered to the parent node such as the RN 110 or DgNB 212 using F1-AP messages.

Figure 14:
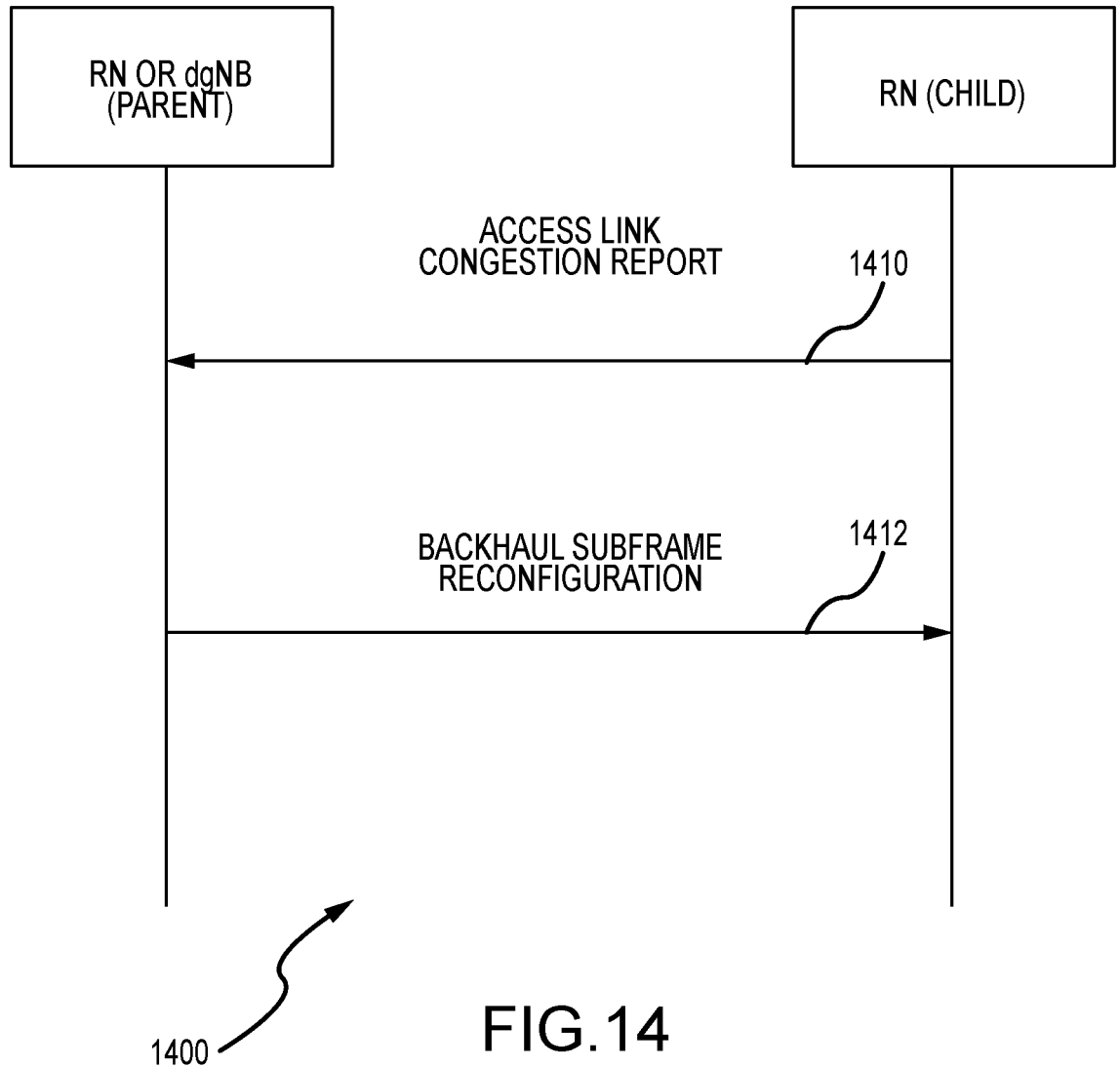
FIG. 14 is a diagram of access link congestion reporting in accordance with one or more embodiments.

Referring now to FIG. 14, a diagram of access link congestion reporting in accordance with one or more embodiments will be discussed. FIG. 13 shows an example of the RN access link congestion report procedure 1400 to send an RN Access Link Congestion Report. Because the backhaul link and the access link share the same time resource, it is important for a RN 110 or a DgNB 212 to adaptively control the number of backhaul subframes based on both the backhaul load locally available, as well as the access load of its child RN 110. Currently, however, an RN 110 or a DgNB 212 does not know anything about the access loading of its child RNs. It is proposed to have an RN 110 report to its parent RN 110 or DgNB 212 one or more of the following "Access Link Congestion Report" information elements via MAC control or RRC signaling via the Access Link Congestion report procedure 1410. Access Link Congestion Indicator is a bit to indicate whether the RN needs more resource for its access link. Downlink Buffer Status Report is the total number of bytes that are waiting to be delivered to its child nodes. Uplink Buffer Status Report is the total number of bytes that are waiting to be received from its child nodes.

In response, the parent RN or DgNB may reconfigure backhaul subframes via MAC control or RRC signaling via procedure 1412. If the CU/DU splitting architecture as specified 3GPP TS 38.401 is supported, and the Relay Node is operated as DU and the DgNB operated as CU. The Access Link Congestion Report may be delivered to the parent node such as the RN or DgNB using F1-AP messages.

Figure 15:
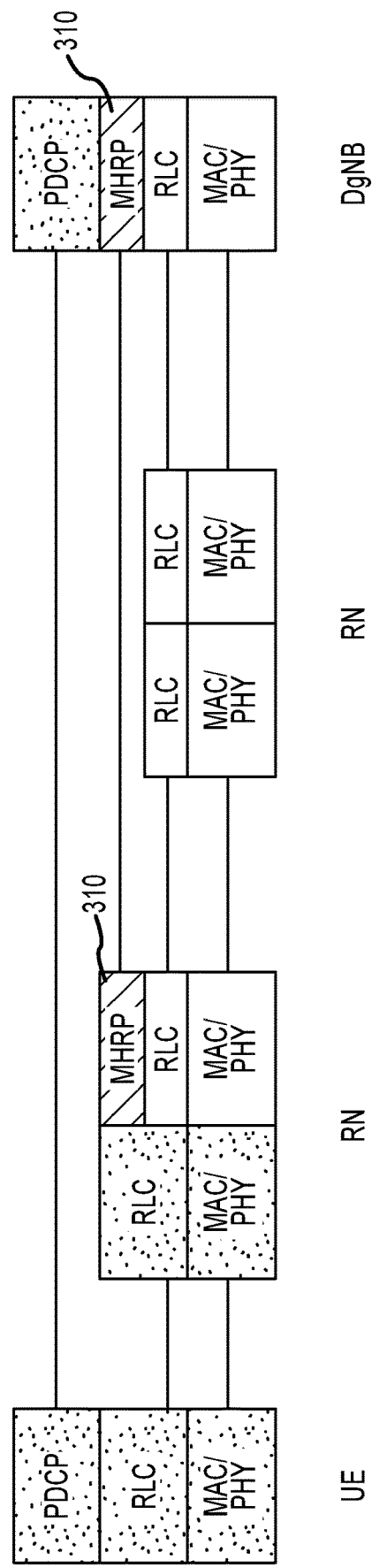
FIG. 15 is a diagram of a centralized multi-hop relaying protocol stack in accordance with one or more embodiments.

Referring now to FIG. 15, a diagram of a centralized multi-hop relaying protocol stack in accordance with one or more embodiments will be discussed. In FIG. 2, above, a new centralized multi-hop relay architecture was proposed to support self-backhauling in which the RN 110 no longer terminates CN interfaces such as the S2 interface or the X2 interface as the LTE relay architecture, and the UE radio bearer is split between the RN 110 and DgNB 212 such that PDCP is terminated at the DgNB 212 for centralized processing while RLC is terminated at the RN for low latency retransmission. A new adaptation layer, the Multi-Hop Relaying Protocol (MHRP) layer 310, was introduced between PDCP and RLC to handle new functionalities. Such new functionalities may include multi-hop forwarding to add fort the UL or to remove for the DL the MHRP header if the packet is for a UE that is attached to the RN, and to forward the MHRP PDU to next hop accordingly. Another new functionality may be UE radio bearer (RB) multiplexing to map (multiplex or demultiplex) multiple UE RBs with the same QoS requirement) to an RN RB.

In or more embodiments, the following issues may be addressed. Temporary Link Failure (TLF) refers to when the link between a RN and its child node such as a UE or RN is lost temporarily, for example due to blockage, the RN should notify its parent nodes the RN or DgNB to stop forwarding DL data of the UEs that are impacted by the lost link. On the other hand, if an RN detects that its link to its parent node such as the RN or DgNB is lost, the RN 110 should notify all its child nodes (e.g. RN or dgNB) about the TLF event so that the impacted UEs (or RNs) may trigger fast cell switch (with multi-connectivity) [4] to continue data transfer in another cell. Multi-Hop Flow Control refers to when a downlink RB between UE and RN or between two RNs is experiencing congestion, the RN should notify its parent node the RN or the DgNB to slow down forwarding traffic that will be delivered through the congested RB.

The basic principle is to let an RN 110 notify its upstream or downstream node so that they can take appropriate actions for example to stop sending data, trigger fast cell switching, and so on, to mitigate the impact of temporary link failure. On the other hand, the RLC status report may be extended such that an RN 110 can send the "desired buffer status" of its downstream RB to its parent node so that it can control the flow accordingly.

Figure 16:
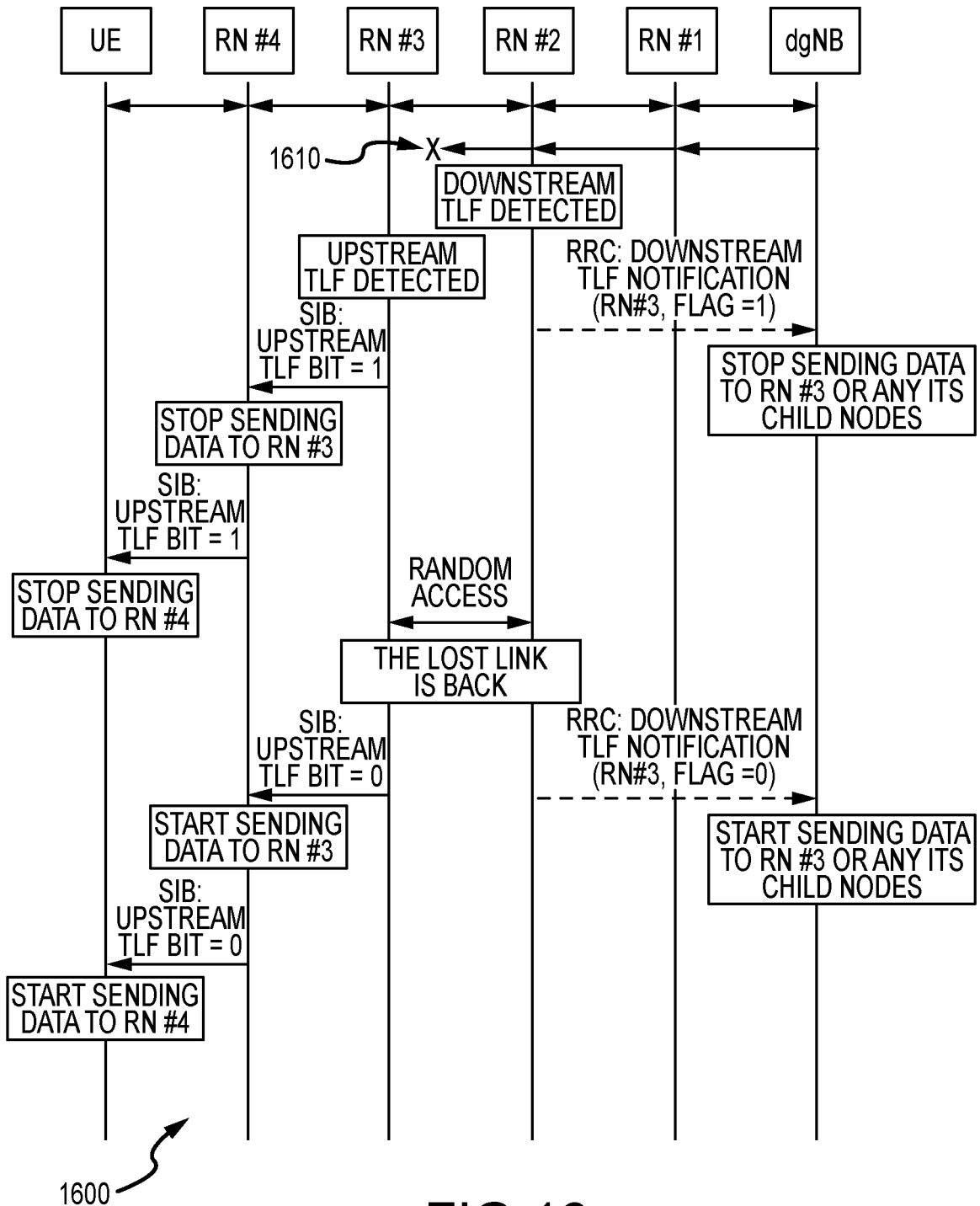
FIG. 16 is a diagram of a downstream or upstream temporary link failure (TLF) notification process in accordance with one or more embodiments.

Referring now to FIG. 16, a diagram of a downstream or upstream temporary link failure (TLF) notification process in accordance with one or more embodiments will be discussed. For Temporary Link Failure (TLF) Notification, the RN 110 may detect the link to its child node, the UE or the RN, is temporarily lost through any of the following events: consecutive HARQ failures, consecutive ARQ (RLC/AM) failures, missing periodic UL control signal such as channel quality information (CQI) feedback, or reference signal such as the UL sounding reference signal.

On the other hand, the RN 110 may detect the link to its parent node, the RN or DgNB, is temporarily lost through periodic downlink control or reference signal. Regardless, the algorithm for detecting such Temporary Link Failure (TLF) may be specific to RN implementation. How to detect the lost link is back is also implementation specific. For example, an RN 110 can detect the lost link is back by successful random access.

In one or more embodiments, a new approach may be implemented to allow a RN experiencing TLF to notify its upstream or downstream nodes so that they can take appropriate actions to avoid buffer bloat and packet drop at the RN 110. Specifically, a DgNB 212 that receives TLF notification from any of its child RNs can stop sending out any data or control packet that will be delivered through the lost link. On the other hand, a downstream RN or UE that receives TLF notification from its parent RN may trigger fast cell switching to continue its data transfer in another cell. In the meantime, an RN 110 should forward TLF notification to its child nodes which may be multiple hops away from the RN 110 that experiences TLF.

FIG. 16 shows an example for the proposed TLF notification procedure 1600. In the example shown in FIG. 16, a UE is connected to DgNB 212 via four Relay Nodes: RN #1, RN #2, RN #3, and RN #4. In one example, the link between RN #2 and RN #3 may be lost as shown at link loss event 1610. As a result, RN #2 will send an RRC message to its serving DgNB 212, and the message should include the new "Downstream TLF Notification" information element, which contains at least the following parameters. One parameter may include an RN ID or UE ID of the downstream node such as the cell radio network temporary identifier (C-RNTI) of the lost link. Another parameter may include a flag comprising a bit field to indicate that the message is to start ("1") or stop ("0") TLF notification.

In addition, RN #2 may include such information in the media access control (MAC) control header of the uplink MAC PDU sent to its parent node (e.g. RN #1), and RN #1 will then forward such information as part of the MAC control header of the MAC protocol data unit (PDU) sent to its own parent node such as DgNB 212. By including "Downstream TLF Notification" in the MAC control header, any intermediate RN between the RN experiencing TLF and the DgNB can be made aware of the TLF event, and therefore stop sending data to the impacted RNs or UEs. Moreover, if the central unit (CU)/distributed unit (DU) splitting architecture as specified 3GPP TS 38.401 is supported, Relay Node 110 operates as DU and DgNB 212 operates as CU. The Downstream TLF Notification may be delivered to DgNB 212 (CU) using F1-AP messages.

On the other hand, RN #3 may detect upstream TLF. In one or more embodiments, a new bit field "Upstream TLF Notification" is added in the broadcast channel for example in a System Information Block (SIB). This bit field will indicate that the cell is temporarily unavailable due to its upstream TLF. An RN 110 may not broadcast the "Upstream TLF Notification" message if the RN 110 has an alternative path and/or link to DgNB 212. In addition, the RN 110 may include the cell identification info such as the physical cell identifier (PCI) of the cell that is experiencing TLF.

An RN 110 or UE that receives a broadcast message such as an SIB with the "Upstream TLF Notification" bit set to 1 should stop sending UL data and may trigger fast cell switching to continue data transfer in another cell. Moreover, the RN 110 should broadcast the "Upstream TLF Notification" message in its own cell if it has no alternative link or path to DgNB 212.

Figure 17:
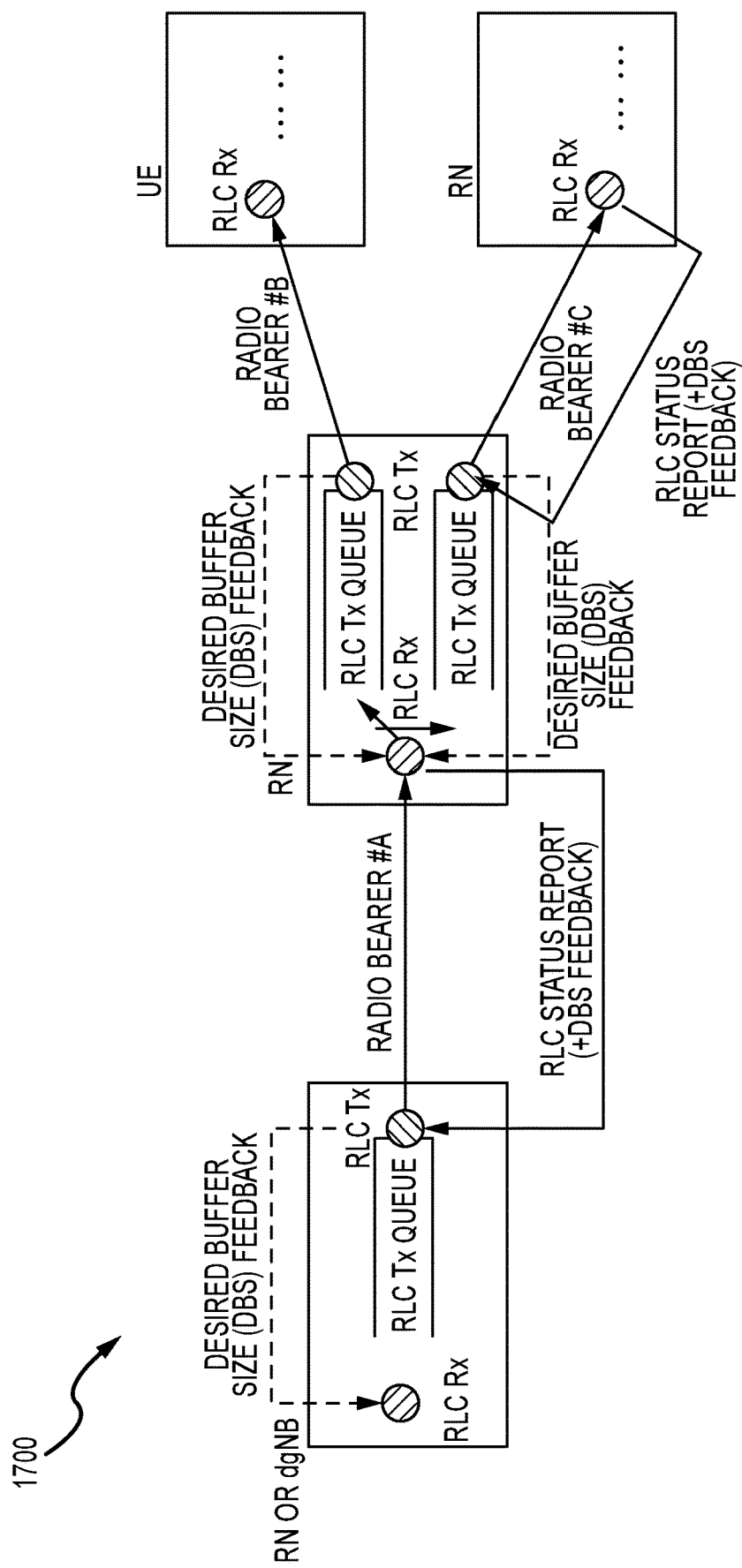
FIG. 17 is a diagram of RLC-based multi-hop flow control system in accordance with one or more embodiments.

Referring now to FIG. 17, a diagram of RLC-based multi-hop flow control system in accordance with one or more embodiments will be discussed. FIG. 4 illustrates a radio link control (RLC) based multi-hop flow control process 1700. In the multi-hop flow control process 1700, the RLC transmit (Tx) entity of a downstream radio bearer (RB) feeds back its desired buffer size (DBS), downlink buffer size, or explicit congestion notification, to the co-located RLC receive (Rx) entity of the corresponding upstream RB, and then the RLC Rx entity reports DBS feedback to its parent RLC Tx entity.

It is up to RN implementation to estimate "DBS". In one example, the following variables may be defined. VT(A) is the sequence number (SN) of the next RLC PDU for which a positive acknowledgment is to be received in-sequence. VT(B) is the SN of the last RLC PDU in the RLC Tx queue. AM_Window_Size is the RLC acknowledgement mode (AM) transmission window size. VT(MS) is the SN of the last RLC PDU that is allowed to be transmitted for a given RLC transmission window size. Thus, $VT(MS)=AM\_Window\_Size+VT(A)$ As a result, the maximum number of RLC PDUs that a downstream RB can transmit may be obtained as VT(MS)−VT(B), which can then be used as Desired Buffer Size (DBS) in the unit of RLC PDUs. Thus, $DBS=VT(MS)-VT(B)=VT(A)-VT(B)+AM\_Window\_Size$ The RLC Rx entity of the RN may include "DBS Feedback" for each of its downstream RB in its RLC status report sent to the corresponding RLC Tx entity of the parent node such as RN 110 or DgNB 212. The new "DBS feedback" information element should include at least the following:

---
Number of Downstream Relay RBs
    For each Relay RB, include the following:
{
    Number of UE RBs (that are delivered over the Relay RB)
    For each UE RB, include the following"
        UE RB Identification (UE ID, RN ID, RB ID)
        Desired Buffer Size (DBS) of the downstream RB (in the unit of RLC PDUs/SDUs or Bytes)
        Downlink Buffer Size of the downstream RB (in the unit of RLC PDUs/ SDUs or Bytes)
        Explicit Congestion Notification (1-bit flag)
}

---

While one design is proposed in FIG. 17 in the context of centralized multi-hop relaying, the principles of RLC-based multi-hop flow control process 1700 also may be applicable for alternative designs. For example, the design of process 1700 may be applied to alternate relaying architecture such as the legacy LTE relay architecture, the 3GPP Release 15 enhanced Proximity Services (ProSe) UE-to-network relaying architecture, or potentially any other relay system, and the scope of the claimed subject matter is not limited in these respects. While the optimizations are described herein in the context of mmWave, the principles covered also may have general applicability and may be applied with low frequency bands such as below 6 GHz, and the scope of the claimed subject matter is not limited in this respect.

Figure 18:
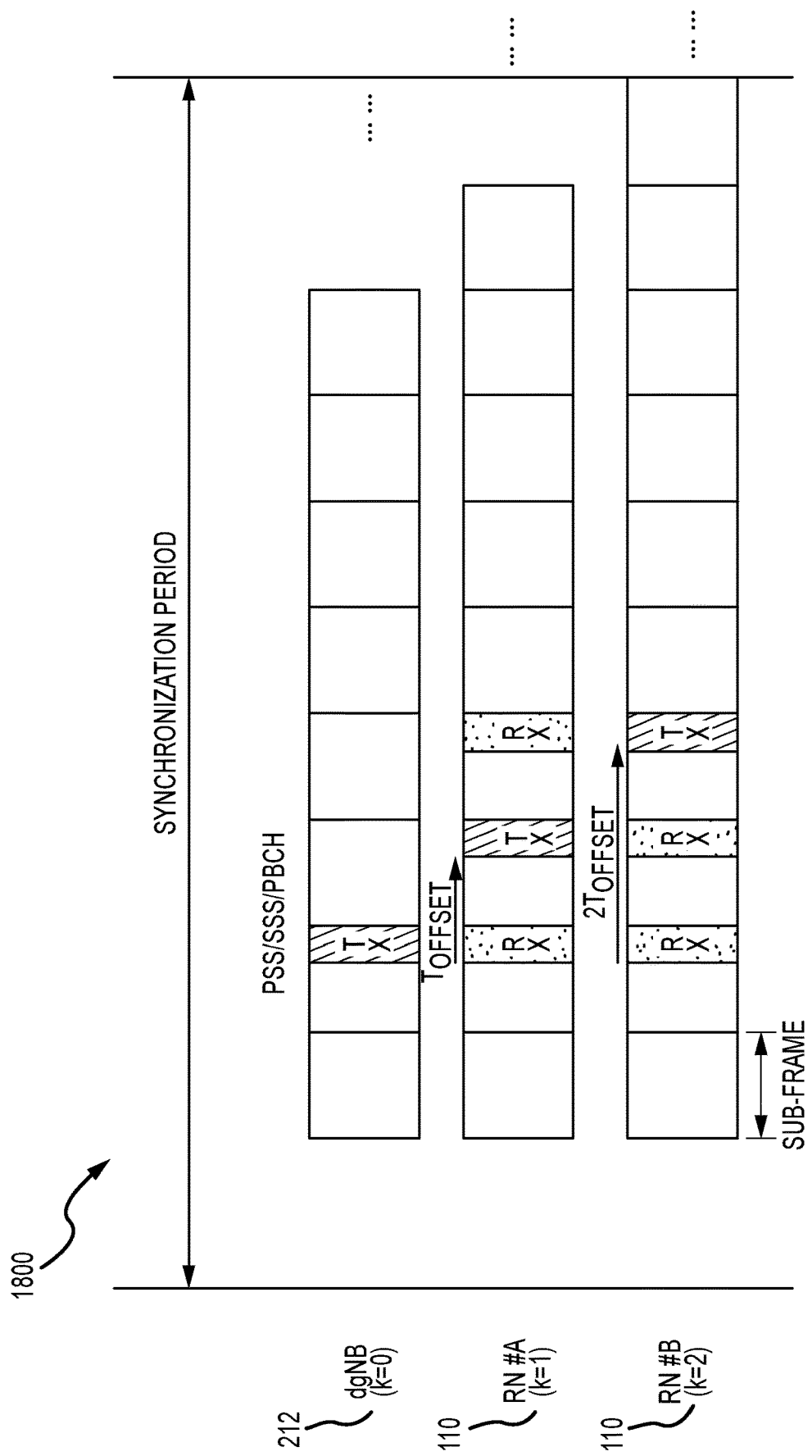
FIG. 18 is a diagram of TDM-based PSS/SSS/PBCH allocation for a multi-hop relay system in accordance with one or more embodiments.

Referring now to FIG. 18, a diagram of TDM-based PSS/SSS/PBCH allocation for a multi-hop relay system in accordance with one or more embodiments will be discussed. The basic principle is to multiplex PSS/SSS/PBCH, also known as a Synchronization Signal (SS) burst, of neighboring RN cells with time-division multiplexing (TDM). Moreover, a relay node (RN) may temporarily skip transmitting its own sync and broadcast signal so that it can receive and/or measure PSS/SSS/PBCH of neighboring cells that may use the same time configuration.

In one or more embodiments, a new system configuration parameter—"Sync Time Offset (STO)" may be defined that specifies the time offset between an alternative configuration of PSS/SSS/PBCH allocation and the reference configuration. Using D to denote "Sync Time Offset":

$D=k\times Toffset$, where $k=0 \sim N-1$

Toffset is the unit of Sync Time Offset (STO) measured by the number of subframes or frames. N indicates the total number of available STO configurations.

In one example, DgNB 212 or RN 110 may provide the STO configuration: (k, Toffset) to its child RN via RRC messages when it is attached initially, and the RN should then configure its PSS/SSS/PBCH allocation for its own cell accordingly. In another example, DgNB 212 or RN 110 may provide the STO configuration (N, Toffset) to its child RN via RRC or broadcast message and let its child RN choose the parameter "k" itself. Alternatively, both N and Toffset may be pre-defined and known to an RN 110 in advance.

FIG. 18 shows an example frame structure 1800 showing how PSS/SSS/PBCH allocation may be distributed in a frame with N=3 and Toffset=1 subframe. In this example, DgNB 212, a first RN 110 (RN #A), and a second RN 110 (RN #B) is configured with k=0, 1, and 2, respectively. As a result, RN #B can transmit PSS/SSS/PBCH in its own cell with k=2, while receiving and/or monitoring PSS/SSS/PBCH from DgNB 212 and RN #A with k=0 and 2, respectively. Similarly, RN #A transmits PSS/SSS/PBCH in its own cell with k=1 and receive PSS/SSS/PBCH from DgNB 212 and RN #B with k=0 and 1, respectively.

Figure 19:
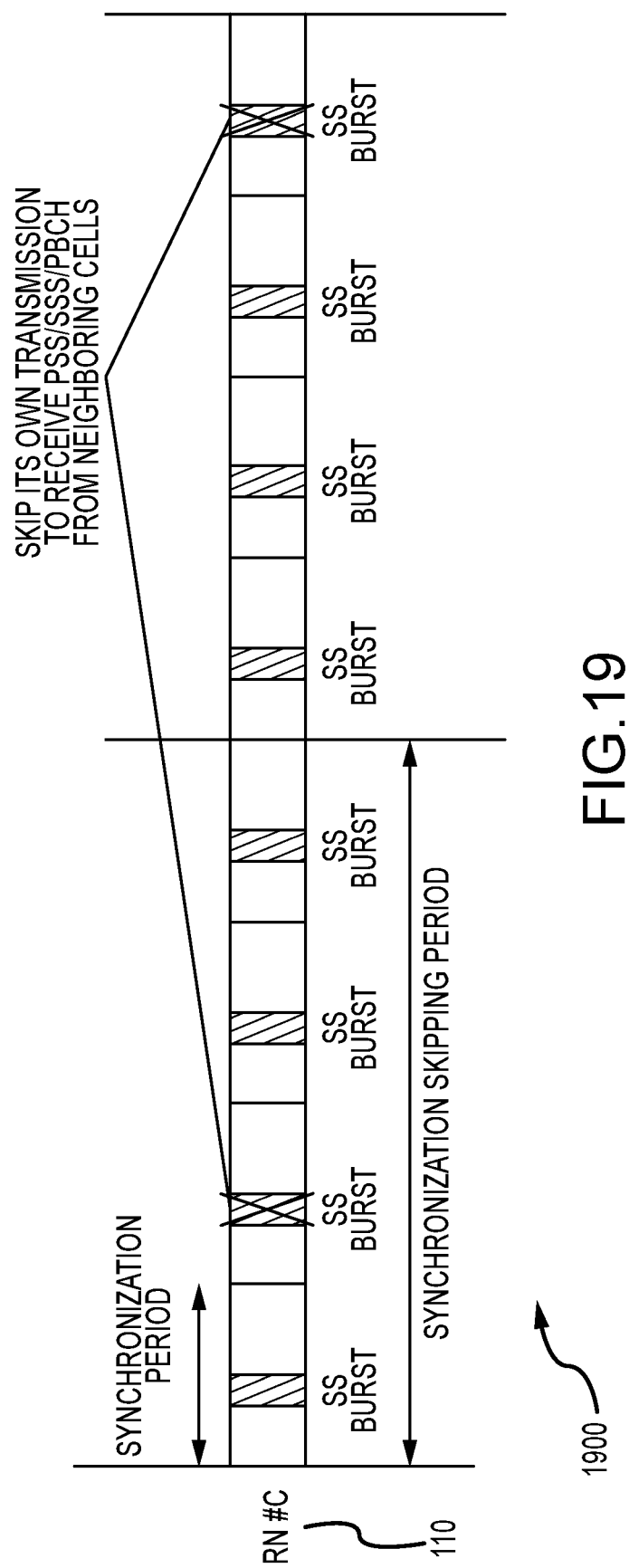
FIG. 19 is a diagram of a synchronization skipping period in accordance with one or more embodiments.

Referring now to FIG. 19, a diagram of a synchronization skipping period in accordance with one or more embodiments will be discussed. In the example frame structure 1900, another RN 110 110 (RN #C) wants to join the network. RN #C may be in the coverage of RN #B, but not RN #A or DgNB 212. In such an arrangement, RN #C can only receive PSS/SSS/PBCH from RN #B with k=2, and then configure itself to transmit PSS/SSS/PBCH in its own cell with k=1. As a result, RN #C can only monitor neighboring cells DgNB 212 or RN #B with k=0 or 2 but not the ones RN #A with k=1. Hence, an RN 110 may be unable to discover neighboring cells using the same STO configuration as itself. In one or more embodiments, the RN 110 may randomly skip its own PSS/SSS/PBCH transmission once very L synchronization periods wherein L is a new system configuration parameter—"Synchronization Skipping Period (SSP)". The RN 110 can then measure and receive PSS/SSS/PBCH from its neighboring cells with the same STO configuration. FIG. 19 shows an example with L=4.

An RN 110 should send the SSP parameter (L) via RRC or broadcast message to its child RNs and UEs so that they can expect one missing SS burst for every L bursts. Randomization prevents neighboring cells with the same STO configuration from skipping at the same time. If two cells skip transmitting SS burst at the same time, then the two cells may not be able to discover each other. The probability of taking two RNs longer than n×L synchronization periods to discover each other is therefore given by:

$P_n=(1/L)^n$

In the above example, if RN #C moves towards RN #A and finds out that the received signal from RN #A is much stronger than from its serving cell RN #B). RN #C may handover to RN #A. If the handover is successful, RN #C will reconfigure itself to use a different STO configuration such as k=2 from its new serving cell RN #A and will notify its own child RNs or UEs about the new STO configuration via an RRC or a broadcast message. The message should provide the starting frame number (SFN) of the new STO configuration, as well as the new STO configuration (k).

Figure 20:
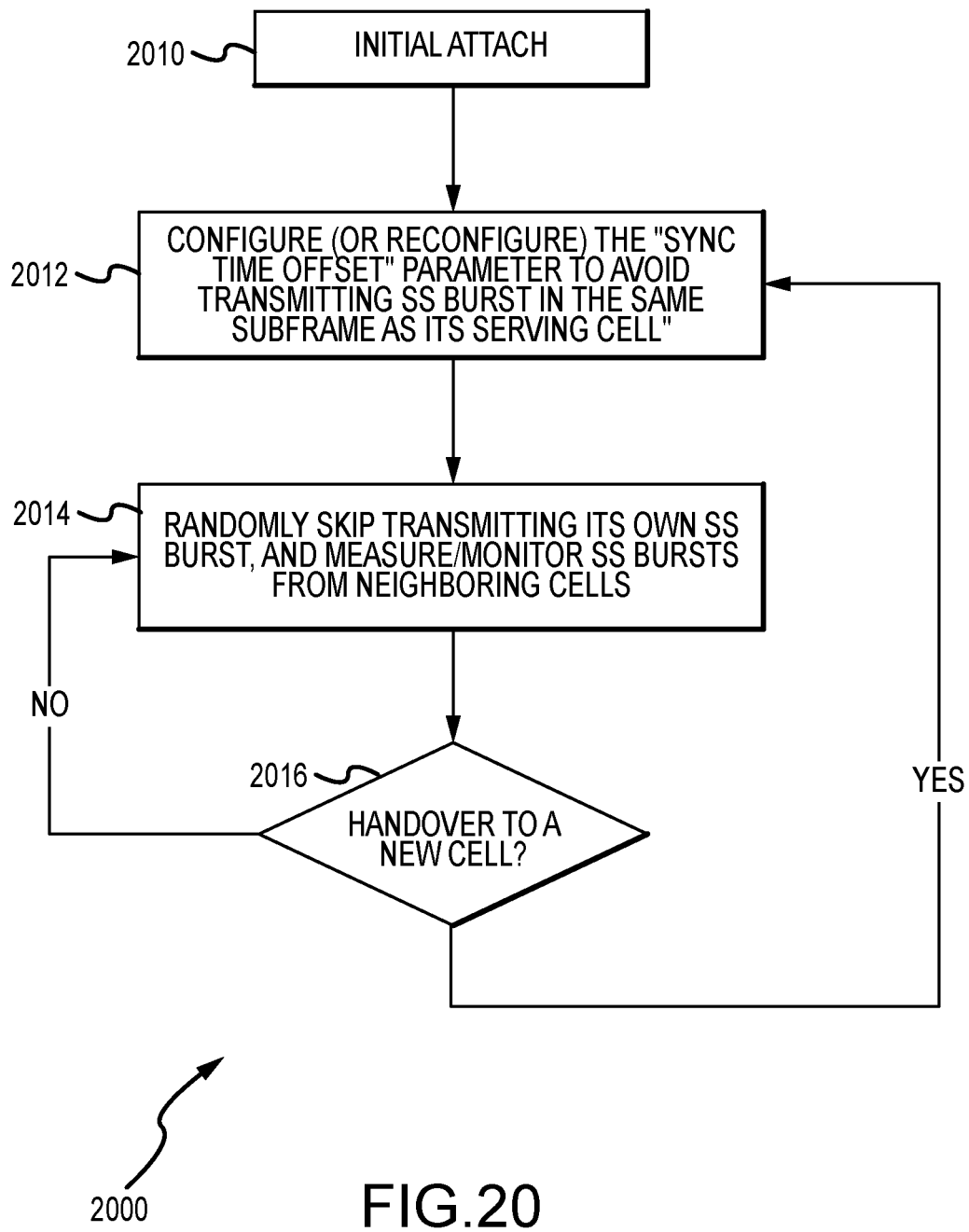
FIG. 20 is a diagram of an adaptive PSS/SSS/PBCH (SS burst) allocation procedure in accordance with one or more embodiments.

Referring now to FIG. 20, a diagram of an adaptive PSS/SSS/PBCH (SS burst) allocation procedure in accordance with one or more embodiments will be discussed. FIG. 20 shows a flow chart of the proposed adaptive PSS/SSS/PBCH (SS burst) allocation and neighbor discovery procedure 2000. Although one particular order and number of operations are shown, it should be noted that procedure 2000 may have more or fewer operations in one or more alternative orders, and the scope of the claimed subject matter is not limited in these respects. As shown in FIG. 20, procedure 200 may include at least the following operations. After successful initial attach at operation or after a handover as determined at operation 2016, a Relay Node may configure (or reconfigure) its Sync Time Offset (STO) parameter at operation 2012 to avoid transmitting SS burst in the same sub frame as its serving cell. At operation 2014, a Relay Node 110 periodically receives and monitors all possible SS burst allocations to discovery neighboring cells. The Relay Node 110 randomly skips transmitting its own SS burst in order to receive from neighboring cells that may use the same Sync-Time-Offset (STO) configuration.

Figure 21:
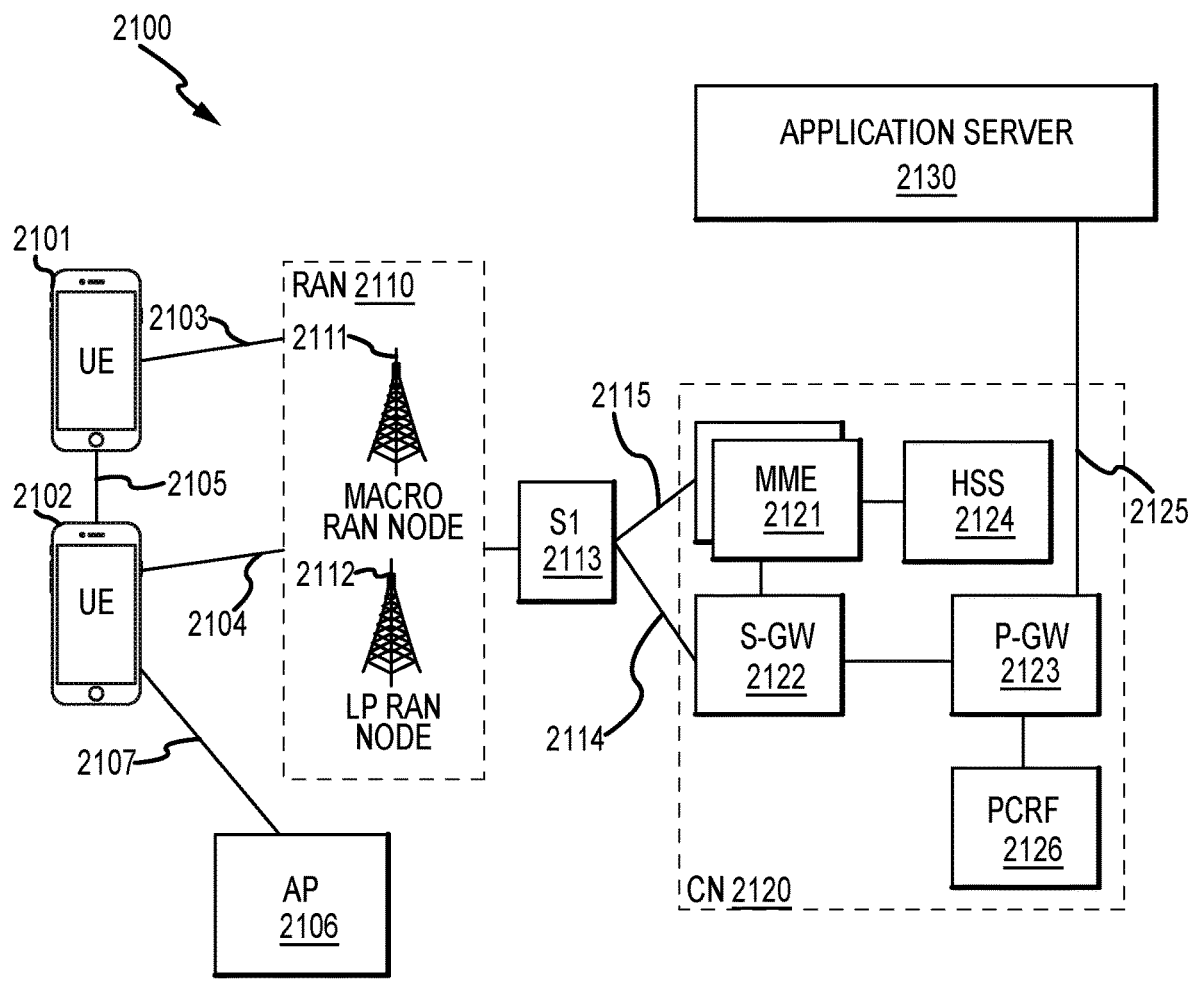
FIG. 21 illustrates an architecture of a system of a network in accordance with some embodiments.

FIG. 21 illustrates an architecture of a system 2100 of a network in accordance with some embodiments. The system 2100 is shown to include a user equipment (UE) 2101 and a UE 2102. The UEs 2101 and 2102 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 2101 and 2102 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 2101 and 2102 may be configured to connect, e.g., communicatively couple, with a radio access network (RAN) 2110—the RAN 2110 may be, for example, an Evolved Universal Mobile Telecommunications System (UMTS) Terrestrial Radio Access Network (E-UTRAN), a NextGen RAN (NG RAN), or some other type of RAN. The UEs 2101 and 2102 utilize connections 2103 and 2104, respectively, each of which comprises a physical communications interface or layer (discussed in further detail below); in this example, the connections 2103 and 2104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 2101 and 2102 may further directly exchange communication data via a ProSe interface 2105. The ProSe interface 2105 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 2102 is shown to be configured to access an access point (AP) 2106 via connection 2107. The connection 2107 can comprise a local wireless connection, such as a connection consistent with any IEEE 802.11 protocol, wherein the AP 2106 would comprise a wireless fidelity (WiFi®) router. In this example, the AP 2106 is shown to be connected to the Internet without connecting to the core network of the wireless system (described in further detail below).

The RAN 2110 can include one or more access nodes that enable the connections 2103 and 2104. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 2110 may include one or more RAN nodes for providing macrocells, e.g., macro RAN node 2111, and one or more RAN nodes for providing femtocells or picocells (e.g., cells having smaller coverage areas, smaller user capacity, or higher bandwidth compared to macrocells), e.g., low power (LP) RAN node 2112.

Any of the RAN nodes 2111 and 2112 can terminate the air interface protocol and can be the first point of contact for the UEs 2101 and 2102. In some embodiments, any of the RAN nodes 2111 and 2112 can fulfill various logical functions for the RAN 2110 including, but not limited to, radio network controller (RNC) functions such as radio bearer management, uplink and downlink dynamic radio resource management and data packet scheduling, and mobility management.

In accordance with some embodiments, the UEs 2101 and 2102 can be configured to communicate using Orthogonal Frequency-Division Multiplexing (OFDM) communication signals with each other or with any of the RAN nodes 2111 and 2112 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 2111 and 2112 to the UEs 2101 and 2102, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 2101 and 2102. The physical downlink control channel (PDCCH) may carry information about the transport format and resource allocations related to the PDSCH channel, among other things. It may also inform the UEs 2101 and 2102 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 2111 and 2112 based on channel quality information fed back from any of the UEs 2101 and 2102. The downlink resource assignment information may be sent on the PDCCH used for (e.g., assigned to) each of the UEs 2101 and 2102.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 2110 is shown to be communicatively coupled to a core network (CN) 2120—via an S1 interface 2113. In embodiments, the CN 2120 may be an evolved packet core (EPC) network, a NextGen Packet Core (NPC) network, or some other type of CN. In this embodiment the S1 interface 2113 is split into two parts: the S1-U interface 2114, which carries traffic data between the RAN nodes 2111 and 2112 and the serving gateway (S-GW) 2122, and the S1-mobility management entity (MME) interface 2115, which is a signaling interface between the RAN nodes 2111 and 2112 and MMEs 2121.

In this embodiment, the CN 2120 comprises the MMEs 2121, the S-GW 2122, the Packet Data Network (PDN) Gateway (P-GW) 2123, and a home subscriber server (HSS) 2124. The MMEs 2121 may be similar in function to the control plane of legacy Serving General Packet Radio Service (GPRS) Support Nodes (SGSN). The MMEs 2121 may manage mobility aspects in access such as gateway selection and tracking area list management. The HSS 2124 may comprise a database for network users, including subscription-related information to support the network entities' handling of communication sessions. The CN 2120 may comprise one or several HSSs 2124, depending on the number of mobile subscribers, on the capacity of the equipment, on the organization of the network, etc. For example, the HSS 2124 can provide support for routing/roaming, authentication, authorization, naming/addressing resolution, location dependencies, etc.

The S-GW 2122 may terminate the S1 interface 2113 towards the RAN 2110, and routes data packets between the RAN 2110 and the CN 2120. In addition, the S-GW 2122 may be a local mobility anchor point for inter-RAN node handovers and also may provide an anchor for inter-3GPP mobility. Other responsibilities may include lawful intercept, charging, and some policy enforcement.

The P-GW 2123 may terminate an SGi interface toward a PDN. The P-GW 2123 may route data packets between the EPC network 2123 and external networks such as a network including the application server 2130 (alternatively referred to as application function (AF)) via an Internet Protocol (IP) interface 2125. Generally, the application server 2130 may be an element offering applications that use IP bearer resources with the core network (e.g., UMTS Packet Services (PS) domain, LTE PS data services, etc.). In this embodiment, the P-GW 2123 is shown to be communicatively coupled to an application server 2130 via an IP communications interface 2125. The application server 2130 can also be configured to support one or more communication services (e.g., Voice-over-Internet Protocol (VoIP) sessions, PTT sessions, group communication sessions, social networking services, etc.) for the UEs 2101 and 2102 via the CN 2120.

The P-GW 2123 may further be a node for policy enforcement and charging data collection. Policy and Charging Enforcement Function (PCRF) 2126 is the policy and charging control element of the CN 2120. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 2126 may be communicatively coupled to the application server 2130 via the P-GW 2123. The application server 2130 may signal the PCRF 2126 to indicate a new service flow and select the appropriate Quality of Service (QoS) and charging parameters. The PCRF 2126 may provision this rule into a Policy and Charging Enforcement Function (PCEF) (not shown) with the appropriate traffic flow template (TFT) and QoS class of identifier (QCI), which commences the QoS and charging as specified by the application server 2130.

Figure 22:
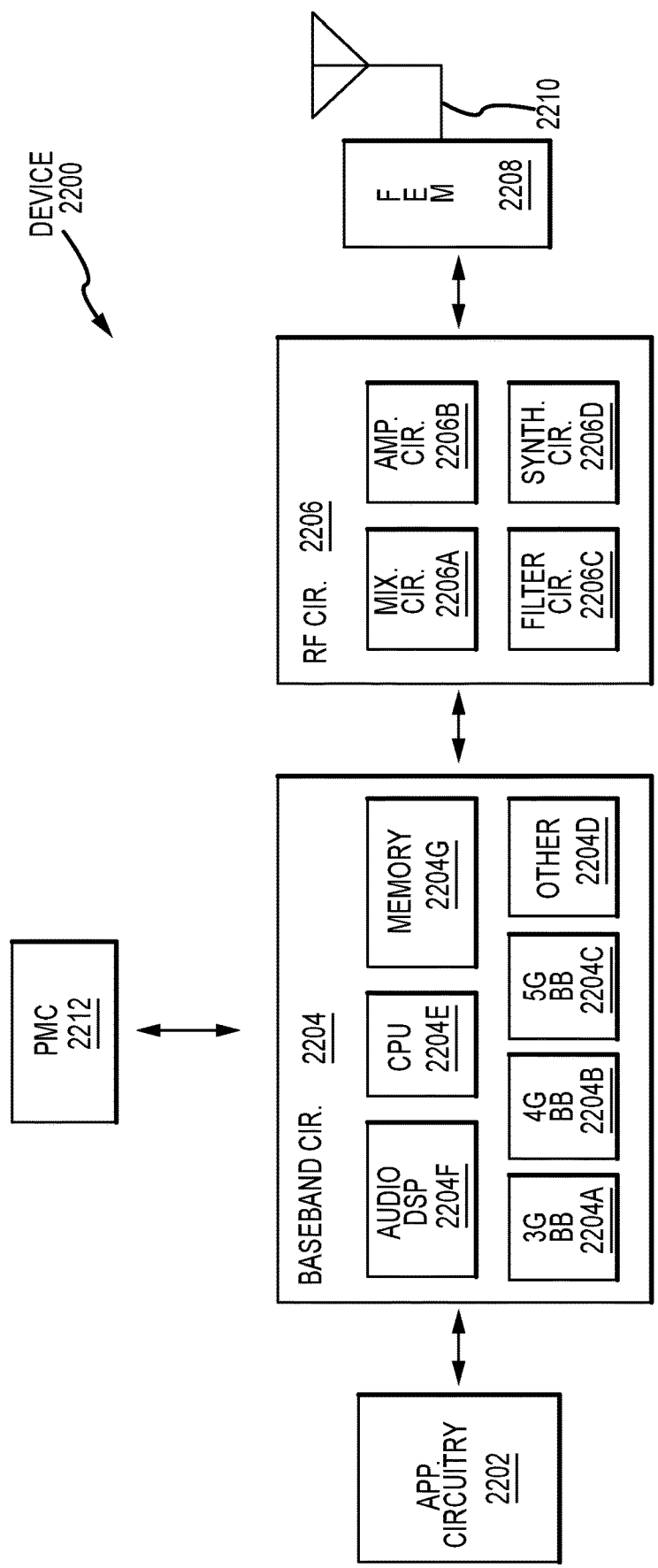
FIG. 22 illustrates example components of a device in accordance with some embodiments.

FIG. 22 illustrates example components of a device 2200 in accordance with some embodiments. In some embodiments, the device 2200 may include application circuitry 2202, baseband circuitry 2204, Radio Frequency (RF) circuitry 2206, front-end module (FEM) circuitry 2208, one or more antennas 2210, and power management circuitry (PMC) 2212 coupled together at least as shown. The components of the illustrated device 2200 may be included in a UE or a RAN node. In some embodiments, the device 2200 may include less elements (e.g., a RAN node may not utilize application circuitry 2202, and instead include a processor/controller to process IP data received from an EPC). In some embodiments, the device 2200 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 2202 may include one or more application processors. For example, the application circuitry 2202 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 2200. In some embodiments, processors of application circuitry 2202 may process IP data packets received from an EPC.

The baseband circuitry 2204 may include circuitry such as, but not limited to, one or more single-core or multi-core processors. The baseband circuitry 2204 may include one or more baseband processors or control logic to process baseband signals received from a receive signal path of the RF circuitry 2206 and to generate baseband signals for a transmit signal path of the RF circuitry 2206. Baseband processing circuity 2204 may interface with the application circuitry 2202 for generation and processing of the baseband signals and for controlling operations of the RF circuitry 2206. For example, in some embodiments, the baseband circuitry 2204 may include a third generation (3G) baseband processor 2204A, a fourth generation (4G) baseband processor 2204B, a fifth generation (5G) baseband processor 2204C, or other baseband processor(s) 2204D for other existing generations, generations in development or to be developed in the future (e.g., second generation (2G), sixth generation (6G), etc.). The baseband circuitry 2204 (e.g., one or more of baseband processors 2204A-D) may handle various radio control functions that enable communication with one or more radio networks via the RF circuitry 2206. In other embodiments, some or all of the functionality of baseband processors 2204A-D may be included in modules stored in the memory 2204G and executed via a Central Processing Unit (CPU) 2204E. The radio control functions may include, but are not limited to, signal modulation/demodulation, encoding/decoding, radio frequency shifting, etc. In some embodiments, modulation/demodulation circuitry of the baseband circuitry 2204 may include Fast-Fourier Transform (FFT), precoding, or constellation mapping/demapping functionality. In some embodiments, encoding/decoding circuitry of the baseband circuitry 2204 may include convolution, tail-biting convolution, turbo, Viterbi, or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 2204 may include one or more audio digital signal processor(s) (DSP) 2204F. The audio DSP(s) 2204F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 2204 and the application circuitry 2202 may be implemented together such as, for example, on a system on a chip (SOC).

In some embodiments, the baseband circuitry 2204 may provide for communication compatible with one or more radio technologies. For example, in some embodiments, the baseband circuitry 2204 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 2204 is configured to support radio communications of more than one wireless protocol may be referred to as multi-mode baseband circuitry.

RF circuitry 2206 may enable communication with wireless networks using modulated electromagnetic radiation through a non-solid medium. In various embodiments, the RF circuitry 2206 may include switches, filters, amplifiers, etc. to facilitate the communication with the wireless network. RF circuitry 2206 may include a receive signal path which may include circuitry to down-convert RF signals received from the FEM circuitry 2208 and provide baseband signals to the baseband circuitry 2204. RF circuitry 2206 may also include a transmit signal path which may include circuitry to up-convert baseband signals provided by the baseband circuitry 2204 and provide RF output signals to the FEM circuitry 2208 for transmission.

In some embodiments, the receive signal path of the RF circuitry 2206 may include mixer circuitry 2206a, amplifier circuitry 2206b and filter circuitry 2206c. In some embodiments, the transmit signal path of the RF circuitry 2206 may include filter circuitry 2206c and mixer circuitry 2206a. RF circuitry 2206 may also include synthesizer circuitry 2206d for synthesizing a frequency for use by the mixer circuitry 2206a of the receive signal path and the transmit signal path. In some embodiments, the mixer circuitry 2206a of the receive signal path may be configured to down-convert RF signals received from the FEM circuitry 2208 based on the synthesized frequency provided by synthesizer circuitry 2206d. The amplifier circuitry 2206b may be configured to amplify the down-converted signals and the filter circuitry 2206c may be a low-pass filter (LPF) or band-pass filter (BPF) configured to remove unwanted signals from the down-converted signals to generate output baseband signals. Output baseband signals may be provided to the baseband circuitry 2204 for further processing. In some embodiments, the output baseband signals may be zero-frequency baseband signals, although this is not a requirement. In some embodiments, mixer circuitry 2206a of the receive signal path may comprise passive mixers, although the scope of the embodiments is not limited in this respect.

In some embodiments, the mixer circuitry 2206a of the transmit signal path may be configured to up-convert input baseband signals based on the synthesized frequency provided by the synthesizer circuitry 2206d to generate RF output signals for the FEM circuitry 2208. The baseband signals may be provided by the baseband circuitry 2204 and may be filtered by filter circuitry 2206c.

In some embodiments, the mixer circuitry 2206a of the receive signal path and the mixer circuitry 2206a of the transmit signal path may include two or more mixers and may be arranged for quadrature downconversion and upconversion, respectively. In some embodiments, the mixer circuitry 2206a of the receive signal path and the mixer circuitry 2206a of the transmit signal path may include two or more mixers and may be arranged for image rejection (e.g., Hartley image rejection). In some embodiments, the mixer circuitry 2206a of the receive signal path and the mixer circuitry 2206a may be arranged for direct downconversion and direct upconversion, respectively. In some embodiments, the mixer circuitry 2206a of the receive signal path and the mixer circuitry 2206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 2206 may include analog-to-digital converter (ADC) and digital-to-analog converter (DAC) circuitry and the baseband circuitry 2204 may include a digital baseband interface to communicate with the RF circuitry 2206.

In some dual-mode embodiments, a separate radio IC circuitry may be provided for processing signals for each spectrum, although the scope of the embodiments is not limited in this respect. In some embodiments, the synthesizer circuitry 2206d may be a fractional-N synthesizer or a fractional N/N+1 synthesizer, although the scope of the embodiments is not limited in this respect as other types of frequency synthesizers may be suitable. For example, synthesizer circuitry 2206d may be a delta-sigma synthesizer, a frequency multiplier, or a synthesizer comprising a phase-locked loop with a frequency divider.

The synthesizer circuitry 2206d may be configured to synthesize an output frequency for use by the mixer circuitry 2206a of the RF circuitry 2206 based on a frequency input and a divider control input. In some embodiments, the synthesizer circuitry 2206d may be a fractional N/N+1 synthesizer.

In some embodiments, frequency input may be provided by a voltage-controlled oscillator (VCO), although that is not a requirement. Divider control input may be provided by either the baseband circuitry 2204 or the applications processor 2202 depending on the desired output frequency. In some embodiments, a divider control input (e.g., N) may be determined from a look-up table based on a channel indicated by the applications processor 2202.

Synthesizer circuitry 2206d of the RF circuitry 2206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 2206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 2206 may include an IQ/polar converter.

FEM circuitry 2208 may include a receive signal path which may include circuitry configured to operate on RF signals received from one or more antennas 2210, amplify the received signals and provide the amplified versions of the received signals to the RF circuitry 2206 for further processing. FEM circuitry 2208 may also include a transmit signal path which may include circuitry configured to amplify signals for transmission provided by the RF circuitry 2206 for transmission by one or more of the one or more antennas 2210. In various embodiments, the amplification through the transmit or receive signal paths may be done solely in the RF circuitry 2206, solely in the FEM 2208, or in both the RF circuitry 2206 and the FEM 2208.

In some embodiments, the FEM circuitry 2208 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 2206). The transmit signal path of the FEM circuitry 2208 may include a power amplifier (PA) to amplify input RF signals (e.g., provided by RF circuitry 2206), and one or more filters to generate RF signals for subsequent transmission (e.g., by one or more of the one or more antennas 2210).

In some embodiments, the PMC 2212 may manage power provided to the baseband circuitry 2204. In particular, the PMC 2212 may control power-source selection, voltage scaling, battery charging, or DC-to-DC conversion. The PMC 2212 may often be included when the device 2200 is capable of being powered by a battery, for example, when the device is included in a UE. The PMC 2212 may increase the power conversion efficiency while providing desirable implementation size and heat dissipation characteristics.

While FIG. 22 shows the PMC 2212 coupled only with the baseband circuitry 2204. However, in other embodiments, the PMC 2212 may be additionally or alternatively coupled with, and perform similar power management operations for, other components such as, but not limited to, application circuitry 2202, RF circuitry 2206, or FEM 2208.

In some embodiments, the PMC 2212 may control, or otherwise be part of, various power saving mechanisms of the device 2200. For example, if the device 2200 is in an RRC_Connected state, where it is still connected to the RAN node as it expects to receive traffic shortly, then it may enter a state known as Discontinuous Reception Mode (DRX) after a period of inactivity. During this state, the device 2200 may power down for brief intervals of time and thus save power.

If there is no data traffic activity for an extended period of time, then the device 2200 may transition off to an RRC_Idle state, where it disconnects from the network and does not perform operations such as channel quality feedback, handover, etc. The device 2200 goes into a very low power state and it performs paging where again it periodically wakes up to listen to the network and then powers down again. The device 2200 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 2202 and processors of the baseband circuitry 2204 may be used to execute elements of one or more instances of a protocol stack. For example, processors of the baseband circuitry 2204, alone or in combination, may be used execute Layer 3, Layer 2, or Layer 1 functionality, while processors of the application circuitry 2204 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 23:
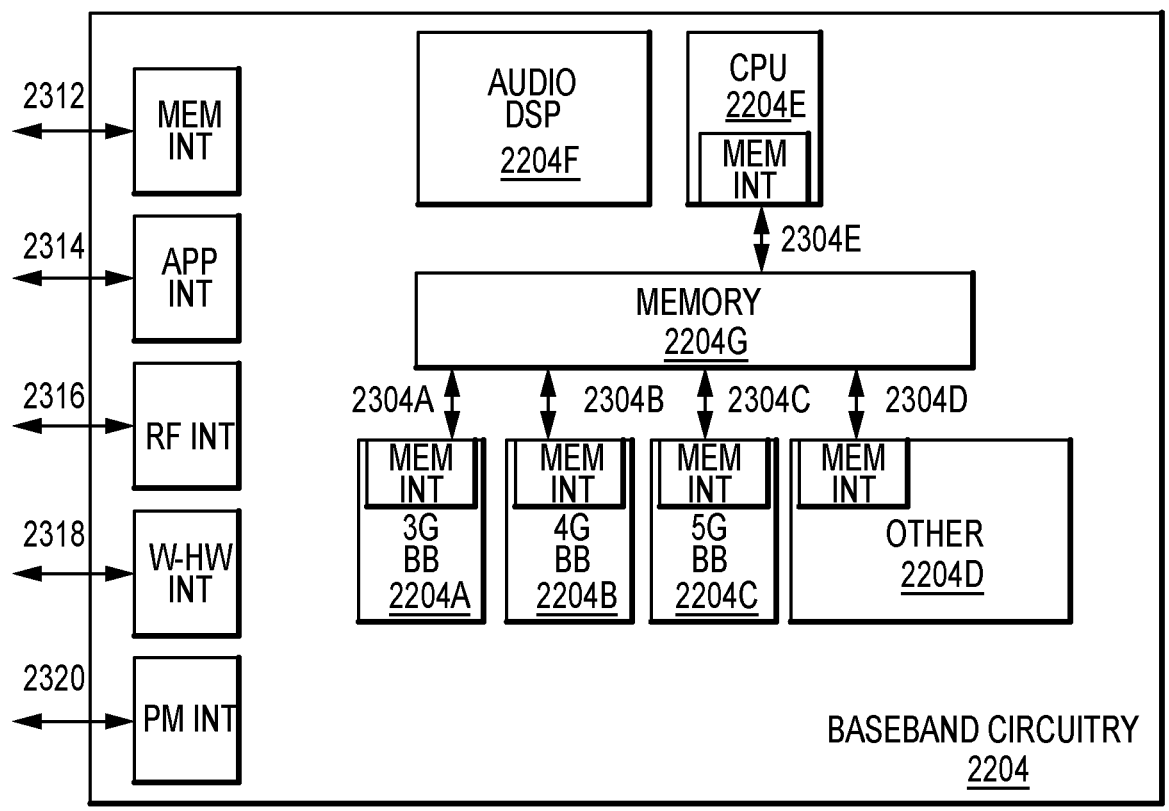
FIG. 23 illustrates example interfaces of baseband circuitry in accordance with some embodiments.

FIG. 23 illustrates example interfaces of baseband circuitry in accordance with some embodiments. As discussed above, the baseband circuitry 2204 of FIG. 22 may comprise processors 2204A-2204E and a memory 2204G utilized by said processors. Each of the processors 2204A-2204E may include a memory interface, 2304A-2304E, respectively, to send/receive data to/from the memory 2204G.

The baseband circuitry 2204 may further include one or more interfaces to communicatively couple to other circuitries/devices, such as a memory interface 2312 (e.g., an interface to send/receive data to/from memory external to the baseband circuitry 2204), an application circuitry interface 2314 (e.g., an interface to send/receive data to/from the application circuitry 2202 of FIG. 22), an RF circuitry interface 2316 (e.g., an interface to send/receive data to/from RF circuitry 2206 of FIG. 22), a wireless hardware connectivity interface 2318 (e.g., an interface to send/receive data to/from Near Field Communication (NFC) components, Bluetooth® components (e.g., Bluetooth® Low Energy), Wi-Fi® components, and other communication components), and a power management interface 2320 (e.g., an interface to send/receive power or control signals to/from the PMC 2212.

As used herein, the terms "circuit" or "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Embodiments described herein may be implemented into a system using any suitably configured hardware and/or software.

The following are example implementations of the subject matter described herein. It should be noted that any of the examples and the variations thereof described herein may be used in any permutation or combination of any other one or more examples or variations, although the scope of the claimed subject matter is not limited in these respects. Example one is directed to an apparatus of a user equipment (UE) comprising one or more baseband processors to generate a first set of one or more radio resource control (RRC) messages to create a packet data convergence protocol (PDCP) and RRC entity at a donor Fifth Generation evolved NodeB (DgNB), and to generate a second set of one or more RRC messages to create a radio link control (RLC) entity at a serving relay node (RN) to couple with the DgNB in a multi-hop relay network, and a memory to store the first set of one or more RRC messages or the second set of one or more RRC messages. In example two the apparatus may include the subject matter of example one or any of the examples described herein, wherein a radio bearer (RB) of the UE is supported by the serving RN and the DgNB together, and wherein a radio bearer between two relay nodes or between a relay node and the DgNB does not include any PDCP entity or RRC entity.

Example three is directed to an apparatus of a relay node (RN), comprising one or more baseband processors to process one or more radio resource control (RRC) messages from a user equipment (UE) to create a radio link control (RLC) entity to serve the UE, and to process packets transported between the UE and a donor Fifth Generation evolved NodeB (DgNB) in a multi-hop relay network, and a memory to store the one or more RRC messages. In example four, the apparatus may include the subject matter of example three or any of the examples described herein, wherein a radio bearer (RB) of the UE is supported by the serving RN and the DgNB together such that the RLC entity is at the serving RN and a packet data convergence protocol (PDCP) and RRC entity is supported by the DgNB. In example five, the apparatus may include the subject matter of example three or any of the examples described herein, wherein the one or more baseband processors are to add a multi-hop relay protocol (MHRP) header to a packet to be forwarded via an uplink to a next relay node or the DgNB, wherein the MHRP header include a UE identifier (ID), an RN ID, or a radio bearer ID, or a combination thereof. In example six, the apparatus may include the subject matter of example three or any of the examples described herein, wherein a payload of the packet comprises a packet data convergence protocol (PDCP) protocol data unit (PDU) or a general packet radio service (GRPS) tunneling protocol user plane (GTP-u) PDU. In example seven, the apparatus may include the subject matter of example three or any of the examples described herein, wherein the one or more baseband processors are to remove a multi-hop relay protocol (MHRP) header from a packet received in a downlink from another relay node or the DgNB, and to cause the packet to be transmitted to the UE. In example eight, the apparatus may include the subject matter of example three or any of the examples described herein, wherein multiple UE radio bearers (RBs) having similar quality of service (QoS) requirements are mapped a radio bearer of an intermediate relay node or the DgNB. In example nine, the apparatus may include the subject matter of example three or any of the examples described herein, wherein the one or more baseband processors are to generate one or more F1-Application Protocol (AP) RRC container messages, wherein the F1-AP RRC container messages carry one or more F1-AP messages including an F1 resource coordination message or an F1 setup message, or a combination thereof. In example ten, the apparatus may include the subject matter of example three or any of the examples described herein, wherein the one or more baseband processors are to generate one or more general packet radio service (GRPS) tunneling protocol user plane (GTP-u) protocol data units (PDUs) without user datagram protocol (UDP)/Internet Protocol (IP) to be delivered to the DgNB as a centralized unit (CU) wherein the RN operates as a distribute unit.

In example eleven, a Fifth Generation (5G) donor evolved NodeB (DgNB) comprises one or more baseband processors to decode one or more radio resource control (RRC) messages from a user equipment (UE) to create a packet data convergence protocol (PDCP) and RRC entity, and to process packets transported between the UE and the DgNB via a relay node (RN) in a multi-hop relay network, and a memory to store the one or more RRC messages. Example twelve may include the subject matter of example eleven or any of the examples described herein, wherein the one or more baseband processors are to process data plane packets transported between the UE and the central unit (CU) of the DgNB via an F1-U interface between the central unit (CU) of the DgNB and the distributed unit (DU) of the DgNB, and to process Layer-2 packets forwarded over a relay link between the RN and the DgNB. Example thirteen may include the subject matter of example eleven or any of the examples described herein, wherein the one or more baseband processors are to process control plane packets transported between the UE and the central unit (CU) of the DgNB via an F1-C interface between the CU of the DgNB and the DU of the DgNB, and to process Layer-2 packets forwarding over a relay link between the RN and the DgNB. Example fourteen is directed to one or more machine readable media having instructions stored thereon that, when executed by an apparatus of a user equipment (UE), result in generating a first set of one or more radio resource control (RRC) messages to create a packet data convergence protocol (PDCP) and RRC entity at a donor Fifth Generation evolved NodeB (DgNB) in a multi-hop relay network, and generating a second set of one or more RRC messages to create a radio link control (RLC) entity at a serving relay node (RN) to couple with the DgNB. Example fifteen may include the subject matter of example fourteen or any of the examples described herein, wherein a radio bearer (RB) of the UE is supported by the serving RN and the DgNB together, and wherein a radio bearer between two relay nodes or between a relay node and the DgNB does not include any PDCP entity or RRC entity.

Example sixteen is directed to one or more machine readable media having instructions stored thereon that, when executed by an apparatus of a relay node (RN), result in processing one or more radio resource control (RRC) messages from a user equipment (UE) to create a radio link control (RLC) entity to serve the UE, and processing packets transported between the UE and a donor Fifth Generation evolved NodeB (DgNB) in a multi-hop relay network. Example seventeen may include the subject matter of example sixteen or any of the examples described herein, wherein a radio bearer (RB) of the UE is supported by the serving RN and the DgNB together such that the RLC entity is at the serving RN and a packet data convergence protocol (PDCP) and RRC entity is supported by the DgNB. Example eighteen may include the subject matter of example sixteen or any of the examples described herein, wherein the instructions, when executed, further result in adding a multi-hop relay protocol (MHRP) header to a packet to be forwarded via an uplink to a next relay node or the DgNB, wherein the MHRP header includes a UE identifier (ID), an RN ID, or a radio bearer ID, or a combination thereof. Example nineteen may include the subject matter of example sixteen or any of the examples described herein, wherein a payload of the packet comprises a packet data convergence protocol (PDCP) protocol data unit (PDU) or a general packet radio service (GRPS) tunneling protocol user plane (GTP-u) PDU. Example twenty may include the subject matter of example sixteen or any of the examples described herein, wherein the instructions, when executed, further result in removing a multi-hop relay protocol (MHRP) header from a packet received in a downlink from another relay node or the DgNB and causing the packet to be transmitted to the UE. Example twenty-one may include the subject matter of example sixteen or any of the examples described herein, wherein multiple UE radio bearers (RBs) having similar quality of service (QoS) requirements are mapped a radio bearer of an intermediate relay node or the DgNB. Example twenty-two may include the subject matter of example sixteen or any of the examples described herein, wherein the instructions, when executed, further result in generating one or more F1-Application Protocol (AP) RRC container messages, wherein the F1-AP RRC container messages carry one or more F1-AP messages including an F1 resource coordination message or an F1 setup message, or a combination thereof. Example twenty-three may include the subject matter of example sixteen or any of the examples described herein, wherein the instructions, when executed, further result in generating one or more general packet radio service (GRPS) tunneling protocol user plane (GTP-u) protocol data units (PDUs) without user datagram protocol (UDP)/Internet Protocol (IP) to be delivered to the DgNB as a centralized unit (CU) wherein the RN operates as a distribute unit.

Example twenty-four is directed to one or more machine readable media having instructions stored thereon that, when executed by A Fifth Generation (5G) donor evolved NodeB (DgNB), result in decoding one or more radio resource control (RRC) messages from a user equipment (UE) to create a packet data convergence protocol (PDCP) and RRC entity, and processing packets transported between the UE and the DgNB via a relay node (RN) in a multi-hop relay network. Example twenty-five may include the subject matter of example twenty-four or any of the examples described herein, wherein the one or more baseband processors are to process data plane packets transported between the UE and the central unit (CU) of the DgNB via an F1-U interface between the central unit (CU) of the DgNB and the distributed unit (DU) of the DgNB, and to process Layer-2 packets forwarded over a relay link between the RN and the DgNB. Example twenty-six may include the subject matter of example twenty-four or any of the examples described herein, wherein the one or more baseband processors are to process control plane packets transported between the UE and the central unit (CU) of the DgNB via an F1-C interface between the CU of the DgNB and the DU of the DgNB, and to process Layer-2 packets forwarding over a relay link between the RN and the DgNB.

Example twenty-seven is directed to an apparatus of a relay node (RN) comprising one or more baseband processors to generate an F1-Application Protocol (AP) message or a radio resource control (RRC) message to be sent to a donor Fifth Generation evolved NodeB (DgNB) in a multi-hop relay network, wherein the F1-AP message or the RRC message includes one or more parameters, comprising: a bit flag to indicate whether the RN is experiencing congestion and needs more radio resource for a next-hop link, a total number of waiting to be transmitted over a downlink, a total number of bytes waiting to be transmitted over an uplink, notice of absence parameters comprising a starting time, an absence duration, and an absence period, or a notification of downstream temporary radio link failure (RLF), including a next-hop RN identifier (RN ID) of a link subject to RLF, and a status of the link, and a memory to store the F1-AP message or the RRC message. Example twenty-eight is directed to an apparatus of a relay node (RN) comprising one or more baseband processors to generate a media access control (MAC) Control Element or a radio link control (RLC) status report to be sent to a serving node, wherein the serving node comprises a next-hop RN or a donor Fifth Generation evolved NodeB (DgNB) in a multi-hop relay network, wherein the MAC Control Element includes one or more parameters, comprising: a bit flag to indicate whether the RN is experiencing congestion and needs more radio resource for a next-hop link, a total number of bytes that are waiting to be transmitted over a downlink, a total number of bytes that are waiting to be transmitted over an uplink, notice of absence parameters comprising a starting time, an absence duration, and an absence period, or a memory to store the MAC Control Element or the RLC status report.

Example twenty-nine is directed to an apparatus of a relay node (RN) comprising one or more baseband processors to generate a broadcast message including a System Information Block (SIB) to be transmitted to a node on a multi-hop relay network, a wherein the broadcast message includes one or more parameters, comprising a notification of upstream temporary radio link failure (RLF) of a link, including the status of the link, and a memory to store the broadcast message. Example thirty is directed to an apparatus of a relay node (RN) comprising: one or more baseband processors to cause the RN to randomly skip transmitting one or more Synchronization Signal (SS) bursts during a skip period, and to process one or more SS bursts received from one or more neighboring cells during the skip period, and a memory to store the one or more received SS bursts.

Example thirty-one is directed to an apparatus of a user equipment (UE) comprising means for generating a first set of one or more radio resource control (RRC) messages to create a packet data convergence protocol (PDCP) and RRC entity at a donor Fifth Generation evolved NodeB (DgNB), and means for generating a second set of one or more RRC messages to create a radio link control (RLC) entity at a serving relay node (RN) to couple with the DgNB in a multi-hop relay network. Example thirty-two is directed to an apparatus of a relay node (RN) comprising means for processing one or more radio resource control (RRC) messages from a user equipment (UE) to create a radio link control (RLC) entity to serve the UE, and means for processing packets transported between the UE and a donor Fifth Generation evolved NodeB (DgNB) in a multi-hop relay network.

Example thirty-three is directed to a Fifth Generation (5G) donor evolved NodeB (DgNB) comprising means for decoding one or more radio resource control (RRC) messages from a user equipment (UE) to create a packet data convergence protocol (PDCP) and RRC entity, and means for processing packets transported between the UE and the DgNB via a relay node (RN) in a multi-hop relay network. Example thirty-four is directed to one or more machine readable media having instructions stored thereon that, when executed by an apparatus of a user equipment (UE) result in means for generating a first set of one or more radio resource control (RRC) messages to create a packet data convergence protocol (PDCP) and RRC entity at a donor Fifth Generation evolved NodeB (DgNB) in a multi-hop relay network, and means for generating a second set of one or more RRC messages to create a radio link control (RLC) entity at a serving relay node (RN) to couple with the DgNB.

Example thirty-five is directed to an apparatus of a relay node (RN) comprising means for processing one or more radio resource control (RRC) messages from a user equipment (UE) to create a radio link control (RLC) entity to serve the UE, and means for processing packets transported between the UE and a donor Fifth Generation evolved NodeB (DgNB) in a multi-hop relay network. Example thirty-six is directed to a Fifth Generation (5G) donor evolved NodeB (DgNB) comprising means for decoding one or more radio resource control (RRC) messages from a user equipment (UE) to create a packet data convergence protocol (PDCP) and RRC entity, and means for processing packets transported between the UE and the DgNB via a relay node (RN) in a multi-hop relay network.

Example thirty-seven is directed to an apparatus of a relay node (RN) comprising means for generating a broadcast message including a System Information Block (SIB) to be transmitted to a node on a multi-hop relay network, wherein the broadcast message includes one or more parameters, comprising a notification of upstream temporary radio link failure (RLF) of a link, including the status of the link, and means for storing the broadcast message. Example thirty-eight is directed to an apparatus of a relay node (RN) comprising means for causing the RN to randomly skip transmitting one or more Synchronization Signal (SS) bursts during a skip period, and means for processing one or more SS bursts received from one or more neighboring cells during the skip period. Example thirty-nine is directed to machine-readable storage including machine-readable instructions that, when executed, to realize an apparatus as claimed in any preceding claim.

Although the claimed subject matter has been described with a certain degree of particularity, it should be recognized that elements thereof may be altered by persons skilled in the art without departing from the spirit and/or scope of claimed subject matter. It is believed that the subject matter pertaining to advanced radio resource management in next-gen multi-hop relaying cellular network and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of a relay node (RN), comprising:
   radio frequency (RF) circuitry configured to communicate with a user equipment (UE) and a donor Fifth Generation evolved NodeB (DgNB); and
   one or more baseband processors configured to have a radio link control (RLC) entity to serve the UE, and to process packets transported between the UE and the DgNB, wherein the one or more baseband processors generate one or more F1-Application Protocol (AP) RRC container messages, wherein the F1-AP RRC container messages carry one or more F1-AP messages including an F1 resource coordination message or an F1 setup message, or a combination thereof.

2. The apparatus of claim 1, wherein a radio bearer (RB) of the UE is supported by the serving RN and the DgNB together such that the RLC entity is at the serving RN and a packet data convergence protocol (PDCP) and RRC entity is supported by the DgNB.

3. The apparatus of claim 1, wherein the one or more baseband processors are configured to add a multi-hop relay protocol (MHRP) header to a packet to be forwarded via an uplink to a next relay node or the DgNB, wherein the MHRP header include a UE identifier (ID), an RN ID, or a radio bearer ID, or a combination thereof.

4. The apparatus of claim 1, wherein a payload of the packet comprises a packet data convergence protocol (PDCP) protocol data unit (PDU) or a general packet radio service (GRPS) tunneling protocol user plane (GTP-u) PDU.

5. The apparatus of claim 1, wherein the one or more baseband processors are configured to remove a multi-hop relay protocol (MHRP) header from a packet received in a downlink from another relay node or the DgNB, and to cause the packet to be transmitted to the UE.

6. The apparatus of claim 1, wherein multiple UE radio bearers (RBs) having similar quality of service (QoS) requirements are mapped a radio bearer of an intermediate relay node or the DgNB.

7. The apparatus of claim 1, wherein the one or more baseband processors are configured to generate one or more general packet radio service (GRPS) tunneling protocol user plane (GTP-u) protocol data units (PDUs) without user datagram protocol (UDP)/Internet Protocol (IP) to be delivered to the DgNB as a centralized unit (CU) wherein the RN operates as a distribute unit.

8. A Fifth Generation (5G) donor evolved NodeB (DgNB), comprising:
   radio frequency (RF) circuitry configured to communicate with a user equipment (UE) and a relay node (RN); and
   one or more baseband processors configured to:
      decode one or more radio resource control (RRC) messages from the UE to create a packet data convergence protocol (PDCP) and RRC entity,
      process packets transported between the UE and the DgNB via the RN, and
      process data plane packets transported between the UE and a central unit (CU) of the DgNB via an F1-U interface between the CU of the DgNB and a distributed unit (DU) of the DgNB.

9. The apparatus of claim 8, wherein the one or more baseband processors are configured to process control plane packets transported between the UE and the central unit (CU) of the DgNB via an F1-C interface between the CU of the DgNB and the DU of the DgNB, and to process Layer-2 packets forwarding over a relay link between the RN and the DgNB.

* * * * *